(12) United States Patent
Banning

(10) Patent No.: US 7,910,754 B2
(45) Date of Patent: *Mar. 22, 2011

(54) COLORANT COMPOUNDS

(75) Inventor: Jeffrey H. Banning, Hillsboro, OR (US)

(73) Assignee: Xerox Corporation, Norwalk, CT (US)

(*) Notice: Subject to any disclaimer, the term of this patent is extended or adjusted under 35 U.S.C. 154(b) by 117 days.

This patent is subject to a terminal disclaimer.

(21) Appl. No.: 12/336,569

(22) Filed: Dec. 17, 2008

(65) Prior Publication Data
US 2009/0099372 A1   Apr. 16, 2009

Related U.S. Application Data

(63) Continuation-in-part of application No. 11/702,757, filed on Feb. 6, 2007, now Pat. No. 7,485,737.

(51) Int. Cl.
*C07C 45/27* (2006.01)
*C07D 219/00* (2006.01)

(52) U.S. Cl. ......... 552/208; 546/102; 523/160; 523/205

(58) Field of Classification Search .................. 552/208; 546/102
See application file for complete search history.

(56) References Cited

U.S. PATENT DOCUMENTS

| | | | |
|---|---|---|---|
| 1,981,515 A | 11/1934 | Kyrides | |
| 1,981,516 A | 11/1934 | Kyrides | |
| 1,991,482 A | 2/1935 | Alleman | |
| 3,653,932 A | 4/1972 | Berry et al. | |
| 3,769,302 A | 10/1973 | Hoover et al. | |
| 4,390,369 A | 6/1983 | Merritt et al. | |
| 4,484,948 A | 11/1984 | Merritt et al. | |
| 4,647,675 A | 3/1987 | Mayer et al. | |
| 4,684,956 A | 8/1987 | Ball | |
| 4,851,045 A | 7/1989 | Taniguchi | |
| 4,889,560 A | 12/1989 | Jaeger et al. | |
| 4,889,761 A | 12/1989 | Titterington et al. | |
| 4,935,059 A | 6/1990 | Mayer et al. | |
| 5,006,170 A | 4/1991 | Schwarz et al. | |
| 5,013,857 A | 5/1991 | Berneth et al. | |
| 5,084,099 A | 1/1992 | Jaeger et al. | |
| 5,151,120 A | 9/1992 | You et al. | |
| 5,221,335 A | 6/1993 | Williams et al. | |
| 5,331,097 A | 7/1994 | Gunnell et al. | |
| 5,372,852 A | 12/1994 | Titterington et al. | |
| 5,496,879 A | 3/1996 | Griebel et al. | |
| 5,507,864 A | 4/1996 | Jaeger et al. | |
| 5,621,022 A | 4/1997 | Jaeger et al. | |
| 5,747,554 A | 5/1998 | Sacripante et al. | |
| 5,782,966 A | 7/1998 | Bui et al. | |
| 5,847,162 A | 12/1998 | Lee et al. | |
| 5,902,841 A | 5/1999 | Jaeger et al. | |
| 6,174,937 B1 | 1/2001 | Banning et al. | |
| 6,309,453 B1 | 10/2001 | Banning et al. | |
| 6,860,931 B2 | 3/2005 | Wu et al. | |
| 6,869,931 B1 | 3/2005 | Mcrae | |
| 7,176,317 B2 | 2/2007 | Banning et al. | |
| 7,485,737 B2 * | 2/2009 | Banning | 552/208 |
| 2008/0186372 A1 | 8/2008 | Banning | |
| 2008/0187665 A1 | 8/2008 | Banning | |
| 2008/0188662 A1 | 8/2008 | Banning | |
| 2008/0188672 A1 | 8/2008 | Banning | |

FOREIGN PATENT DOCUMENTS

| | | |
|---|---|---|
| DE | 1232098 | 5/1971 |
| EP | 0 012 283 | 6/1980 |
| EP | 0187352 | 7/1986 |
| EP | 0206286 | 12/1986 |
| EP | 0 329 026 | 8/1989 |
| EP | 0565798 | 10/1993 |
| EP | 1 348 713 | 9/2003 |
| EP | 1 493 781 | 1/2005 |
| EP | 1 491 596 | 5/2005 |
| GB | 421737 | 12/1934 |
| GB | 2311075 | 9/1997 |
| WO | WO 2005/052069 | 7/2006 |

OTHER PUBLICATIONS

English Abstract for German Patent Publication DE 4205636AL, Aug. 1993.
English Abstract for German Patent Publication DE 4205713AL, Mar. 1996.
English abstract for Japanese Patent Publication JP 61221265, Oct. 1986.
Rhodamine Dyes and Related Compounds, "IV. Aryl- and Benzylrhodamines," I. S. Ioffe et al., translated from Zhumal Obschei Khimii, vol. 32, No. 4, (May 1962), pp. 1480-1485.
Rhodamine Dyes and Related Compounds, "XV. Rhodamine Dyestuffs with Hydroaromatic and Polymethylene Radicals," I. S. Ioffe et al., translated from Zhumal Obschei Khimii, vol. 1, No. 3, (Mar. 1965), pp. 584-586.
Rhodamine Dyes and Related Compounds, "XVI. Butylrhodamines," I. S. Ioffe et al., translated from Zhumal Obschei Khimii, vol. 1, No. 12, (Dec. 1965), pp. 2172-2176.
Rhodamine Dyes and Related Compounds, "XIX. Mutual Transformations of the Colorless and Colored Forms of N,N'-Substituted Rhodamines," I. S. Ioffe et al., translated from Zhumal Obschei Khimii, vol. 8, No. 8, (1972), pp. 1726-1729.
"Structural Conversions of Rhodamines in Solution," McHedlov-Petrosyan et al., translated from Izvestiya Akademii Nauk, Seriya Khimicheskaya, No. 3, pp. 512-521, Mar. 1992.
"Efficient Synthesis of Rhodamine Conjugates through the 2'-position," Grote et al., Biorganic & Medicinal Chemistry Letters 10 (2000), pp. 1539-1541.
European Search Report, European Patent Application No. EP 08 150 137.1, dated Jan. 28, 2009, 4 pages.
European Search Report, European Patent Application No. EP 08 150 770.9, dated May 7, 2008, 4 pages.

* cited by examiner

*Primary Examiner* — Nizal S Chandrakumar
(74) *Attorney, Agent, or Firm* — Marylou J. Lavoie, Esq. LLC

(57) ABSTRACT

A compound of the formula $$\left[ \begin{array}{c} R_1 \\ R_2 \end{array} N \begin{array}{c} \\ (R_5)_a \end{array} \begin{array}{c} Y \\ + \end{array} \begin{array}{c} \\ (R_6)_b \end{array} N \begin{array}{c} R_3 \\ R_4 \end{array} \right]^{A^-} \quad CA^+$$

wherein $R_1$, $R_2$, $R_3$, $R_4$, $R_5$, $R_6$, R', R", Y, $CA^+$, and $A^-$ each, independently of the others are as defined herein.

21 Claims, No Drawings

COLORANT COMPOUNDS

This application is a continuation-in-part application of application Ser. No. 11/702,757, filed on Feb. 6, 2007, incorporated herein by reference in its entirety.

Cross-reference is made to the following co-pending applications:

Co-pending applications U.S. Ser. No. 11/702,758, filed Feb. 6, 2007, entitled "Colorant Compounds" with the named inventor Jeffrey H. Banning, the disclosure of which is totally incorporated herein by reference, and U.S. Ser. No. 11/702,875, filed Feb. 6, 2007, entitled "Phase Change Inks Containing Colorant Compounds," with the named inventor Jeffery H. Banning, the disclosure of which is totally incorporated herein by reference, disclose a phase change ink composition comprising a phase change ink carrier and a colorant compound of the formula as described therein.

Co-pending application U.S. Ser. No. 11/702,932, filed Feb. 6, 2007, entitled "Phase Change Inks Containing Colorant Compounds," with the named inventor Jeffery H. Banning, the disclosure of which is totally incorporated herein by reference, discloses a phase change ink composition comprising a phase change ink carrier and a colorant compound of the formula as described therein.

BACKGROUND

The present disclosure is generally related to colorant compounds. More specifically, the present disclosure is directed to colorant compounds particularly suitable for use in hot melt or phase change inks.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing, as disclosed in, for example, U.S. Pat. No. 5,496,879 and German Patent Publications DE 4205636AL and DE 4205713AL, the disclosures of each of which are totally incorporated herein by reference.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes. The colorants can also include pigments, as disclosed in, for example, U.S. Pat. No. 5,221,335, the disclosure of which is totally incorporated herein by reference. U.S. Pat. No. 5,621,022, the disclosure of which is totally incorporated herein by reference, discloses the use of a specific class of polymeric dyes in phase change ink compositions.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. No. 3,653,932, U.S. Pat. No. 4,390,369, U.S. Pat. No. 4,484,948, U.S. Pat. No. 4,684,956, U.S. Pat. No. 4,851,045, U.S. Pat. No. 4,889,560, U.S. Pat. No. 5,006,170, U.S. Pat. No. 5,151,120, U.S. Pat. No. 5,372,852, U.S. Pat. No. 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

British Patent Publication GB 2 311 075 (Gregory et al.), the disclosure of which is totally incorporated herein by reference, discloses a compound of the formula

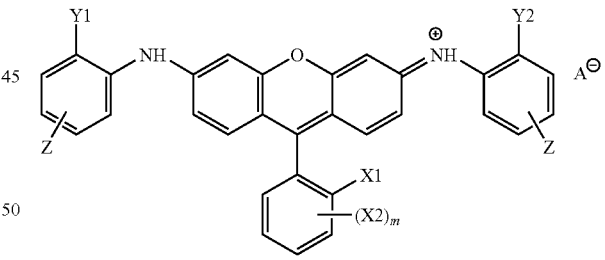

wherein X1 is an ester group or an amide group (such as of a carboxylic or sulfonic acid) or a fatty amine salt of a sulfonic acid, each X2 independently is a substituent, m has a value of from 0 to 2, Y1 and Y2 are each independently H, alkyl, or halo, each Z independently is an ester or amide group, and A– is an anion. The compound is useful as a colorant for toners, D2T2 printing, plastics, polyesters, nylons, and inks, especially ink jet or hot melt inks.

U.S. Pat. No. 1,991,482 (Allemann), the disclosure of which is totally incorporated herein by reference, discloses a process of producing rhodamine dyes which comprises condensing a halogenated primary amine of the benzene series with fluorescein dichloride and sulfonating the condensed product.

U.S. Pat. No. 5,013,857 (Berneth et al.), the disclosure of which is totally incorporated herein by reference, discloses a process for the preparation of sulpho-free triphenyl-methane dyestuffs.

U.S. Pat. No. 5,847,162 (Lee et al.), the disclosure of which is totally incorporated herein by reference, discloses a class of 4,7-dichlororhodamine compounds useful as fluorescent dyes having the structure

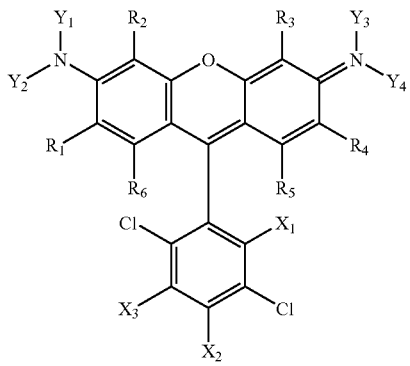

wherein $R_1$-$R_6$ are hydrogen, fluorine, chlorine, lower alkyl lower alkene, lower alkyne, sulfonate, sulfone, amino, amido, nitrile, lower alkoxy, lining group, or combinations thereof or, when taken together, $R_1$ and $R_6$ is benzo, or, when taken together, $R_4$ and $R_5$ is benzo; $Y_1$-$Y_4$ are hydrogen or lower alkyl or, when taken together, $Y_1$ and $R_2$ is propano and $Y_2$ and $R_1$ is propano, or, when taken together, $Y_3$ and $R_3$ is propano and $Y_4$ and $R_4$ is propano; and $X_1$-$X_3$ taken separately are selected from the group consisting of hydrogen, chlorine, fluorine, lower alkyl carboxylate, sulfonic acid, —$CH_2OH$, and linking group. In another aspect, the disclosure includes reagents labeled with the 4,7-dichlororhodamine dye compounds, including deoxynucleotides, dideoxynucleotides, and polynucleotides. In an additional aspect, the disclosure includes methods utilizing such dye compounds and reagents including dideoxy polynucleotide sequencing and fragment analysis methods.

U.S. Pat. No. 4,935,059 (Mayer et al.), the disclosure of which is totally incorporated herein by reference, discloses basic rhodamine dyes suitable for use in recording fluids for the ink jet process and for coloring paper stock having the formula cyclic radical, An– is one equivalent of an anion and m and n are each independently of the other 0 or 1.

U.S. Pat. No. 4,647,675 (Mayer et al.), the disclosure of which is totally incorporated herein by reference, discloses compounds of the general formula

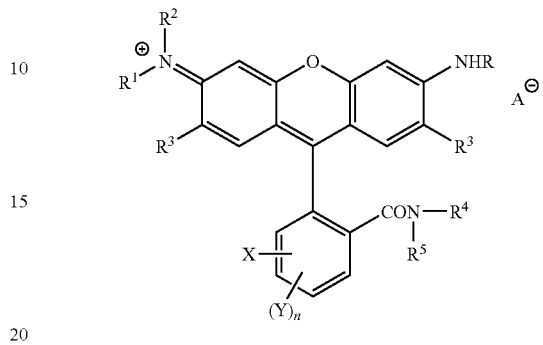

where A– is an anion, R is hydrogen or unsubstituted or substituted alkyl or cycloalkyl, $R_1$ and $R_2$ independently of one another are each hydrogen or unsubstituted or substituted alkyl or cycloalkyl, or one of the radicals may furthermore be aryl, or $R_1$ and $R_2$, together with the nitrogen atom, form a saturated heterocyclic structure, the radicals $R_3$ independently of one another are each hydrogen or $C_1$-$C_4$-alkyl, $R_4$ and $R_5$ independently of one another are each unsubstituted or substituted alkyl or cycloalkyl, or one of the radicals may furthermore be hydrogen, aryl or hetaryl, $R_4$ and $R_5$, together with the nitrogen atom, form a saturated heterocyclic structure, n is 1, 2 or 3, X is hydrogen, chlorine, bromine, $C_1$-$C_4$-alkyl, $C_1$-$C_4$-alkoxy or nitro and Y is hydrogen or chlorine, are particularly useful for dyeing paper stocks.

U.S. Pat. No. 1,981,515 (Kyrides), the disclosure of which is totally incorporated herein by reference, discloses intermediates for rhodamine dyestuffs.

U.S. Pat. No. 1,981,516 (Kyrides), the disclosure of which is totally incorporated herein by reference, discloses intermediates for secondary alkylated rhodamine dyes.

British Patent Publication GB 421 737, the disclosure of which is totally incorporated herein by reference, discloses dyes of the rhodamine series which are prepared by condensing naphthalene-2:3-dicarboxylic acid with a m-aminophenol in which the nitrogen group is substituted by one or two alkyl groups, the products, if desired, being sulphonated. The

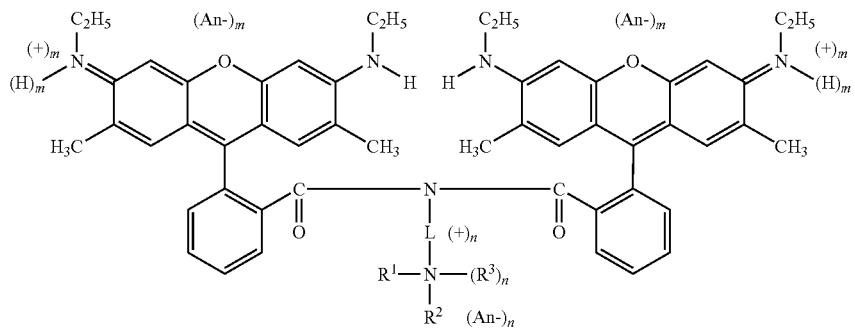

where L is $C_2$-$C_{10}$-alkylene, $R_1$, $R_2$, and $R_3$ are each independently of the others hydrogen, substituted or unsubstituted $C_1$-$C_{10}$-alkyl or $C_5$-$C_7$-cycloalkyl or $R_1$ and $R_2$ together with the nitrogen atom linking them together are a hetero unsulphonated products may be used as lake colouring matters whilst the sulphonated dyes are acid wool dyes. In examples, (1) naphthalene-2:3-dicarboxylic acid is condensed with diethyl-m-aminophenol in the presence of zinc chloride giving a product which dyes tannin-mordanted cotton in the same shade as Rhodamine B and a sulphonated product which dyes wool bluish-red shades; (2) monoethyl-m-aminophenol is used instead of the diethyl-m-aminophenol in example (1), yielding a dye, which when sulphonated dyes wool red-orange shades; (3) 2-ethylamino-p-cresol replaces the diethyl-m-aminophenol in example (1), yielding a dye dyeing and printing tannin-mordanted cotton in shades similar to Rhodamine 69BS and when sulphonated dyeing wool red.

Japanese Patent Publication JP 61221265, the disclosure of which is totally incorporated herein by reference, discloses rhodamine compounds of formula I

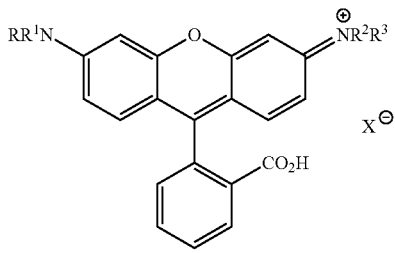

wherein $R_1$, $R_3$ are each lower alkyl; $R_2$ is lower alkyl, 10 C or higher long-chain alkyl; $R_4$ is 10 C or higher long-chain alkyl; X– is an anion, or squarylium compounds of formula II

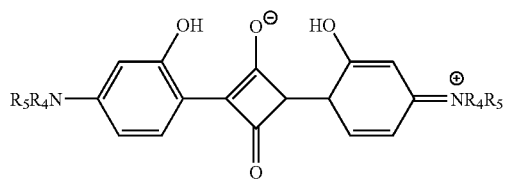

wherein $R_2$ is 10 C or higher long-chain alkyl. Example: 3,6-(N,N'-diethyl-N,N'-dioctadecyl) diamino-9-(2-carboxyphenyl) xanthilium perchlorate. Use: materials for molecular electronics, which are suitable for use as materials for photoelectric converter, optical memory, etc. Preparation: 2-(4-N,N'-diethylamino-2-hydroxybenzoyl)-benzoic acid, which is a condensate between N-ethyl-N-octadecyl-m-hydroxyaniline and phthalic anhydride, is reacted with N-ethyl-N-octadecyl-m-hydroxyaniline to obtain the compound of formula I. 3-$HOC_6H_4N(Et)(CH_2)_{17}Me$ and phthalic anhydride were heated at 150° for 4 hours, treated with aqueous $NH_3$, and the amorphous intermediate mixed with aqueous $HClO_4$ forming a compound of formula I (R=$R_2$=Et; $R_1$=$R_3$=$C_{18}H_{37}$; X=$ClO_4$), having λmax (MeOH) 550 nm.

U.S. Pat. No. 5,084,099 (Jaeger et al.), the disclosure of which is totally incorporated herein by reference, discloses modified phase change ink compatible colorants which comprise a phase change ink soluble complex of (a) a tertiary alkyl primary amine and (b) dye chromophores, i.e., materials that absorb light in the visible wavelength region to produce color having at least one pendant acid functional group in the free acid form (not the salt of that acid). These modified colorants are extremely useful in producing phase change inks when combined with a phase change ink carrier, even though the unmodified dye chromophores have limited solubility in the phase change ink carrier. Thin films of uniform thickness of the subject phase change ink compositions which employ the modified phase change ink colorants exhibit a high degree of lightness and chroma. The primary amine-dye chromophore complexes are soluble in the phase change ink carrier and exhibit excellent thermal stability.

U.S. Pat. No. 5,507,864 (Jaeger et al.), the disclosure of which is totally incorporated herein by reference, discloses a phase change ink composition that includes a combination of different dye types such as an anthraquinone dye and a xanthene dye, which is most preferably a rhodamine dye. While each dye type is insufficiently soluble with respect to favored carrier compositions to preserve color saturation in reduced ink quantity prints, the dye type combination permits increased dye loading and maintains print quality. In a preferred embodiment of the disclosure, a favored carrier composition is adjusted to promote the colored form of a preferred rhodamine dye (C.I. Solvent Red 49) and mixed with a preferred anthraquinone dye (C.I. Solvent Red 172) whose concentration is kept below a critical level to prevent post printed blooming. The resulting preferred phase change ink compositions provide a magenta phase change ink with enhanced light fastness and color saturation, as well as good compatibility with preferred existing subtractive primary color phase change inks.

U.S. Pat. No. 5,621,022 (Jaeger et al.), the disclosure of which is totally incorporated herein by reference, discloses a phase change ink composition wherein the ink composition utilizes polymeric dyes in combination with a selected phase change ink carrier composition.

U.S. Pat. No. 5,747,554 (Sacripante et al.), the disclosure of which is totally incorporated herein by reference, discloses an ink composition comprising a polyesterified-dye (I) or polyurethane-dye (II) with a viscosity of from about 3 centipoise to about 20 centipoise at a temperature of from about 125° C. to about 165° C. and represented by the formulas

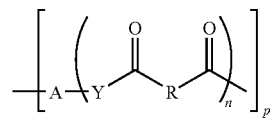

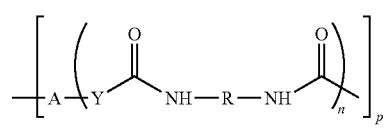

wherein A is an organic chromophore, Y is an oxyalkylene or poly(oxyalkylene), R is an arylene or alkylene, n represents the number of repeating segments, and is an integer of from about 2 to about 50, and p represents the number of chains per chromophore and is an integer of from about 1 to about 6.

U.S. Pat. No. 5,902,841 (Jaeger et al.), the disclosure of which is totally incorporated herein by reference, discloses a phase change ink composition wherein the ink composition utilizes colorant in combination with a selected phase change ink carrier composition containing at least one hydroxy-functional fatty amide compound.

European Patent Publication 0 565 798 (Shustack), the disclosure of which is totally incorporated herein by reference, discloses ultraviolet radiation-curable primary and secondary coating compositions for optical fibers. The primary coatings comprise a hydrocarbon polyol-based reactively terminated aliphatic urethane oligomer; a hydrocarbon monomer terminated with at least one end group capable of reacting with the terminus of the oligomer; and an optional photoinitiator. The secondary coatings comprise a polyester and/or polyether-based aliphatic urethane reactively terminated oligomer; a hydrocarbonaceous viscosity-adjusting component capable of reacting with the reactive terminus of (I); and an optional photoinitiator. Also disclosed are optical fibers coated with the secondary coating alone or with the primary and secondary coatings of the disclosure.

U.S. Pat. No. 7,176,317, of Jeffrey H. Banning et al., and U.S. Pat. No. 6,860,931 of Jeffrey H. Banning et al., the disclosures of each of which are totally incorporated by reference herein, disclose in embodiments compounds of the formulae

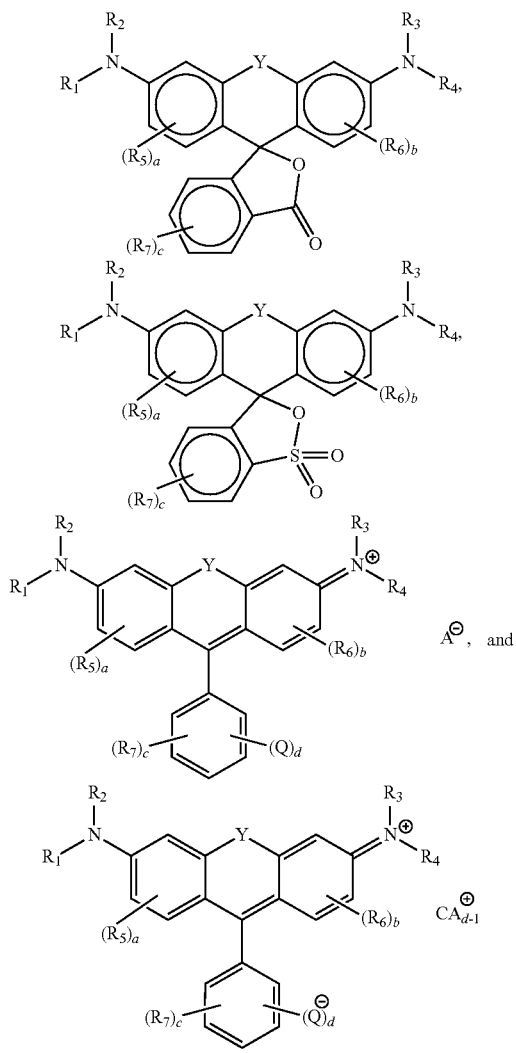

wherein R1, R2, R3, and R4 each, independently of the others, is (i) a hydrogen atom, (ii) an alkyl group, (iii) an aryl group, (iv) an arylalkyl group, or (v) an alkylaryl group, wherein R1 and R2 can be joined together to form a ring, wherein R3 and R4 can be joined together to form a ring, and wherein R1, R2, R3, and R4 can each be joined to a phenyl ring in the central structure, a and b each, independently of the others, is an integer which is 0, 1, 2, or 3, c is an integer which is 0, 1, 2, 3, or 4, each R5, R6, and R7, independently of the others, is (i) an alkyl group, (ii) an aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a cyano group, (xiv) a pyridine or pyridinium group, (xv) an ether group, (xvi) an aldehyde group, (xvii) a ketone group, (xviii) a carbonyl group, (xix) a thiocarbonyl group, (xx) a sulfate group, (xxi) a sulfide group, (xxii) a sulfoxide group, (xxiii) a phosphine or phosphonium group, (xxiv) a phosphate group, (xxv) a mercapto group, (xxvi) a nitroso group, (xxvii) an acyl group, (xxviii) an acid anhydride group, (xxix) an azide group, (xxx) an azo group, (xxxi) a cyanato group, (xxxii) an isocyanato group, (xxxiii) a thiocyanato group, (xxxiv) an isothiocyanato group, (xxxv) a urethane group, or (xxxvi) a urea group, wherein R5, R6, and R7 can each be joined to a phenyl ring in the central structure,

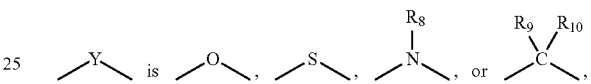

R8, R9, and R10 each, independently of the others, is (i) a hydrogen atom, (ii) an alkyl group, (iii) an aryl group, (iv) an arylalkyl group, or (v) an alkylaryl group, provided that the number of carbon atoms in R1+R2+R3+R4+R5+R6+R7+R8+R9+R10 is at least about 16, each Q, independently of the others, is a COOH group or a SO3H group, each Q-, independently of the others, is a COO— group or a SO3– group, d is an integer which is 1, 2, 3, 4, or 5, A is an anion, and CA is either a hydrogen atom or a cation associated with all but one of the Q- groups, provided that when

at least one of the following of (a), (b), and (c) is true: (a) the number of carbon atoms in R1+R2+R3+R4 is at least about 42, (b) at least one of R1, R2, R3, and R4 is a group of the formula

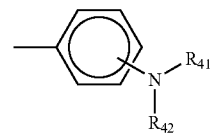

wherein R41 and R42 each, independently of the other, is an alkyl group, an aryl group, an arylalkyl group, or an alkylaryl group, or (c) at least one of R1, R2, R3, and R4 is a branched alkyl group having at least about 19 carbon atoms.

While known compositions and processes are suitable for their intended purposes, a need remains for new magenta colorant compositions. In addition, a need remains for magenta colorant compositions particularly suitable for use in phase change inks. Further, a need remains for magenta colorants with desirable thermal stability. Additionally, a need remains for magenta colorants that exhibit minimal undesirable discoloration when exposed to elevated temperatures. There is also a need for magenta colorants that exhibit a desirable brilliance. In addition, there is a need for magenta colorants that exhibit a desirable hue. Further, there is a need for magenta colorants that are of desirable chroma. Additionally, there is a need for magenta colorants that have desirably high lightfastness characteristics. A need also remains for magenta colorants that have a desirably pleasing color. In addition, a need remains for magenta colorants that exhibit desirable solubility characteristics in phase change ink carrier compositions. Further, a need remains for magenta colorants that enable phase change inks to be jetted at temperatures of over 135° C. while maintaining thermal stability. Further, a need remains for magenta colorants for use in solid ink printers that operate with lower print head temperatures much lower than 135° C. as well as in ultraviolet radiation curable systems. Additionally, a need remains for magenta colorants that enable phase change inks that generate images with low pile height. There is also a need for magenta colorants that enable phase change inks that generate images that approach lithographic thin image quality. In addition, there is a need for magenta colorants that exhibit oxidative stability. Further, there is a need for magenta colorants that do not precipitate from phase change ink carriers. Additionally, there is a need for magenta colorants that do not, when included in phase change inks, diffuse into adjacently printed inks of different colors. A need also remains for magenta colorants that do not leach from media such as phase change ink carriers into tape adhesives, paper, or the like. In addition, a need remains for magenta colorants that, when incorporated into phase change inks, do not lead to clogging of a phase change ink jet printhead. Further, there is a need for magenta colorants that enable phase change inks that generate images with sharp edges that remain sharp over time. Additionally, there is a need for magenta colorants that enable phase change inks that generate images which retain their high image quality in warm climates. Further, there is a need for magenta colorants that enable phase change inks that generate images of desirably high optical density. Additionally, there is a need for magenta colorants that, because of their good solubility in phase change ink carriers, enable the generation of images of low pile height without the loss of desirably high optical density. A need also remains for magenta colorants that enable cost-effective inks.

The appropriate components and process aspects of the each of the foregoing may be selected for the present disclosure in embodiments thereof.

SUMMARY

The present disclosure is directed to a compound of the formula

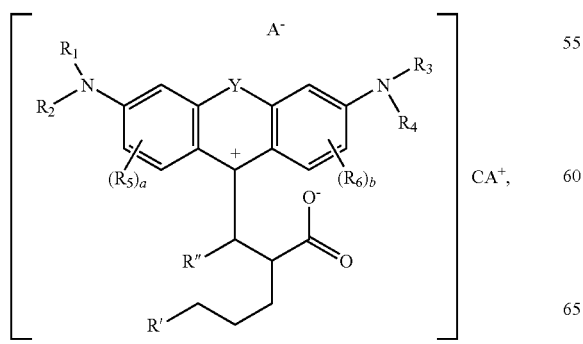

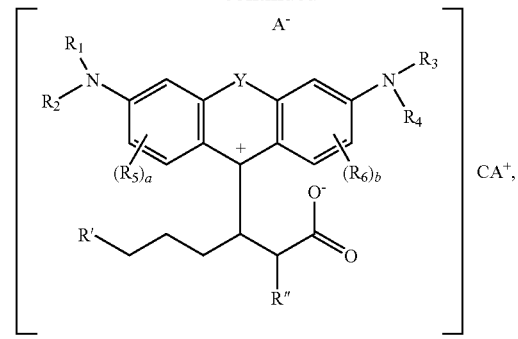

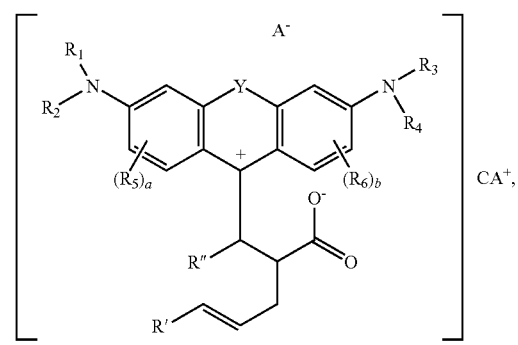

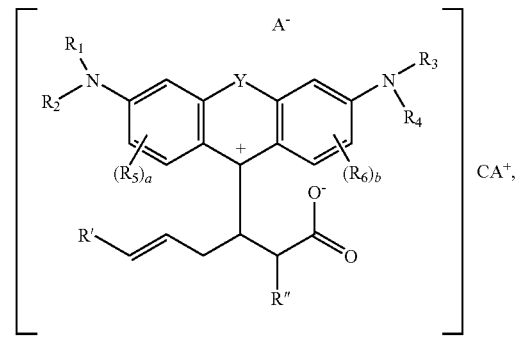

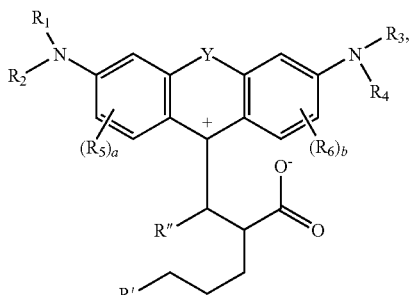

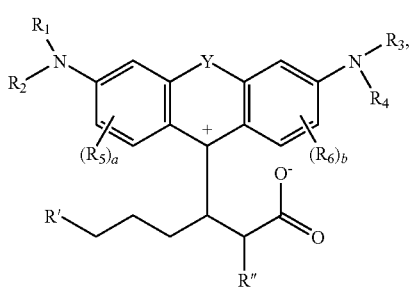

-continued

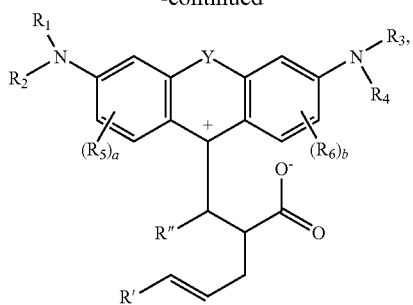

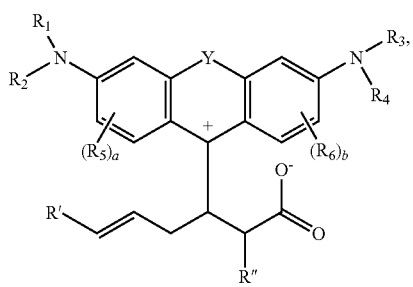

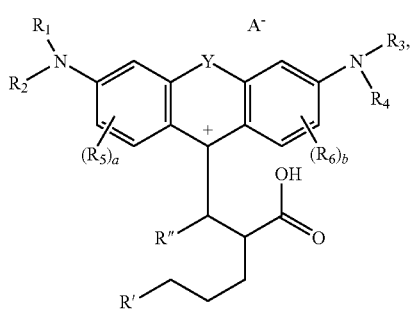

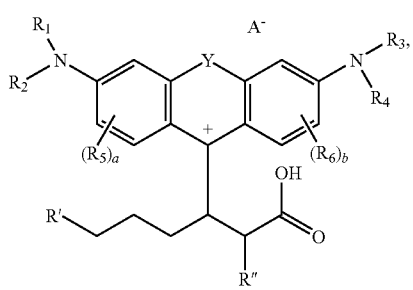

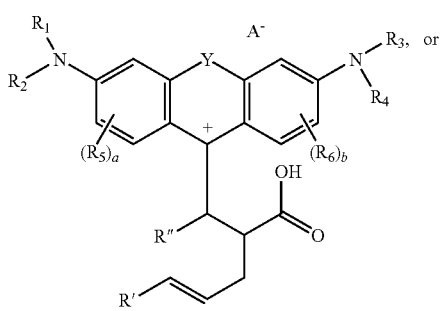

-continued

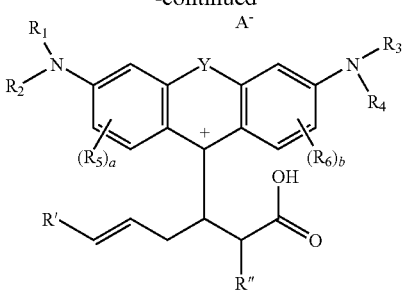

wherein $R_1$, $R_2$, $R_3$, and $R_4$ each, independently of the others, is (i) a hydrogen atom, (ii) an alkyl group, (iii) an aryl group, (iv) an arylalkyl group, or (v) an alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure; wherein a and b each, independently of the others, is an integer which is 0, 1, 2, or 3, wherein $R_5$ and $R_6$ are each optionally present and wherein each of $R_5$ and $R_6$ independently of the other, if present, are independently selected from (i) an alkyl group, (ii) an aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a pyridine or pyridinium group, (xiv) an ether group, (xv) a ketone group, (xvi) a carbonyl group, (xvii) a thiocarbonyl group, (xviii) a sulfate group, (xix) a sulfide group, (xx) a sulfoxide group, (xxi) a phosphine or phosphonium group, (xxii) a phosphate group, (xxiii) a mercapto group, (xxiv) a urethane group, or (xxvi) a urea group, wherein $R_5$ and $R_6$ can each be joined to a phenyl ring in the central structure,

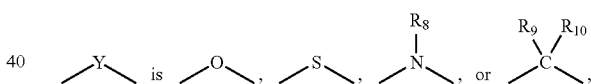

wherein $R_8$, $R_9$, and $R_{10}$ each, independently of the other, is optionally present and wherein, if one or more are present, each of $R_8$, $R_9$, and $R_{10}$ is independently selected from (i) a hydrogen atom, (ii) an alkyl group, (iii) an aryl group, (iv) an arylalkyl group, or (v) an alkylaryl group;

wherein in further embodiments, the number of carbon atoms in $R_1+R_2+R_3++R_5+R_6+R_8+R_9+R_{10}$ is at least about 4, or in another embodiment at least about 16;

wherein R" is optionally present and wherein R' and R", if present, are each independently selected from (i) an alkyl group, (ii) an aryl group, (iii) an arylalkyl group, or (iv) an alkylaryl group, wherein R' or R" are independently selected from linear or branched, saturated or unsaturated, or cyclic components, wherein in embodiments at least one of R' or R" contains at least about 5 carbon atoms, or at least about 6 carbon atoms, wherein in further embodiments, R' or R", if present, are independently selected from an alkyl group containing from about 0 carbon atoms (that is, R" is 0) to about 8 carbon atoms, from about 1 carbon atom to about 8 carbon atoms, or about 12 carbon atoms, or about 18 carbon atoms, or about 30 carbon atoms, or about 50 carbon atoms, or about 100 carbon atoms, wherein in embodiments, R' or R", if present, are independently selected from an aryl group containing about 5 carbon atoms, or about 6 carbon atoms, or about 10 carbon atoms, wherein in embodiments R' or R", if present, are independently an alkylaryl group or an arylalkyl group containing about 7 carbon atoms, or about 30 carbon atoms, or about 50 carbon atoms, or about 100 carbon atoms; for example, in one embodiment, R' contains about 18 carbon atoms and R" is 0 carbon atoms (that is R" is not present); wherein A is an anion, and wherein CA is either a hydrogen atom or a cation.

DETAILED DESCRIPTION

The present disclosure is directed to compounds of the formulae

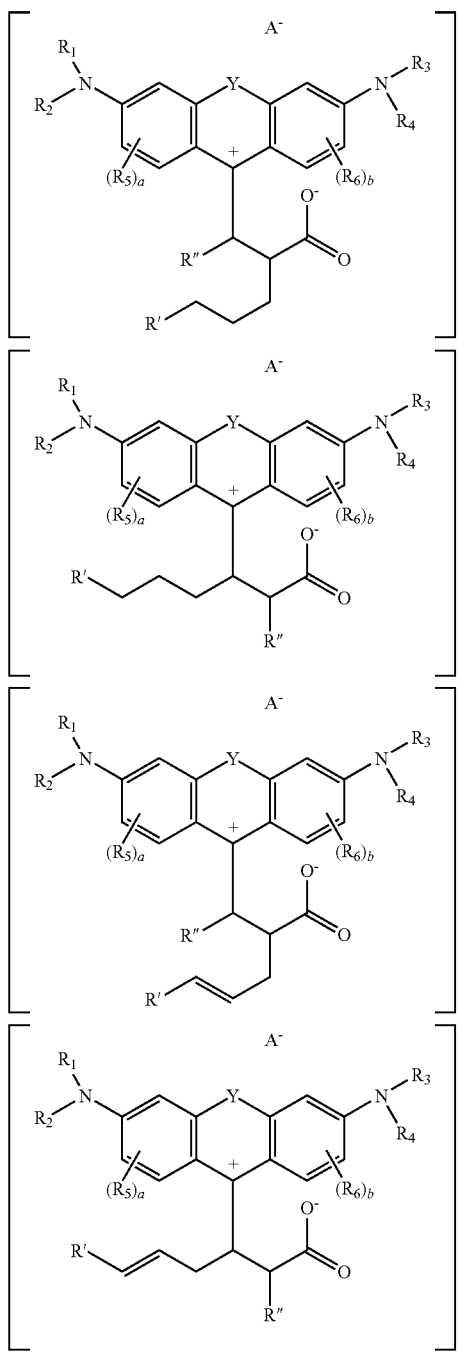

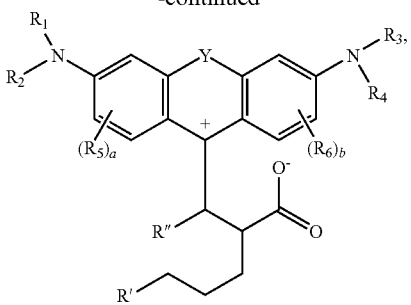

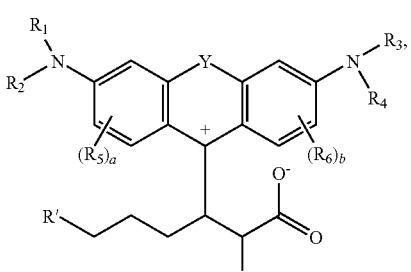

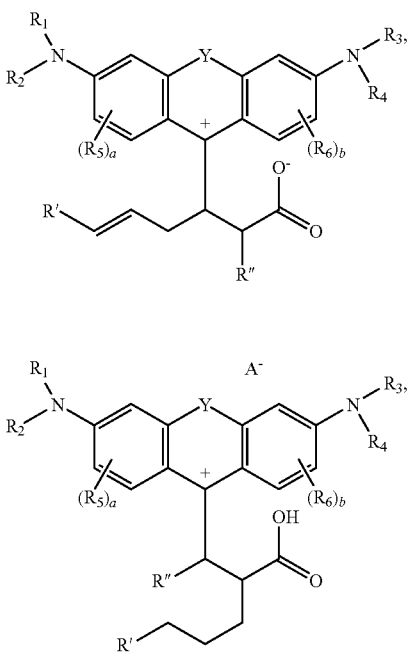

-continued

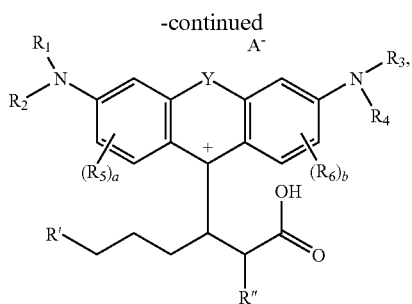

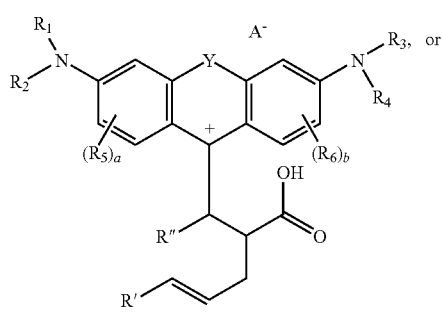

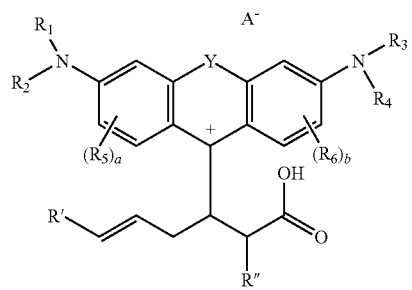

$R_1$, $R_2$, $R_3$, and $R_4$ each, independently of the others, is (i) a hydrogen atom, (ii) an alkyl group, (iii) an aryl group, (iv) an arylalkyl group (arylalkyl group meaning an aryl group with one or more alkyl substituents), or (v) an alkylaryl group (alkylaryl group meaning an alkyl group with one or more aryl substituents), wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure; wherein a and b each, independently of the others, is an integer which is 0, 1, 2, or 3, wherein in embodiments, a and b are each zero;

wherein $R_5$ and $R_6$ are each optionally present and wherein each of $R_5$ and $R_6$ independently of the other, if present, are independently selected from (i) an alkyl group, (ii) an aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a pyridine or pyridinium group, (xiv) an ether group, (xv) a sulfate group, (xvi) a sulfide group, (xvii) a sulfoxide group, (xviii) a phosphine or phosphonium group, (xix) a phosphate group, (xx) a mercapto group, (xxi) a urethane group, or (xxii) a urea group, wherein $R_5$ and $R_6$ can each be joined to a phenyl ring in the central structure;

wherein in embodiments, when $R_5$ and $R_6$ are hydrogen, R' and R" are each independently selected from $C_{15}H_{31}$ and hydrogen; for example, in one embodiment a compound having the structure

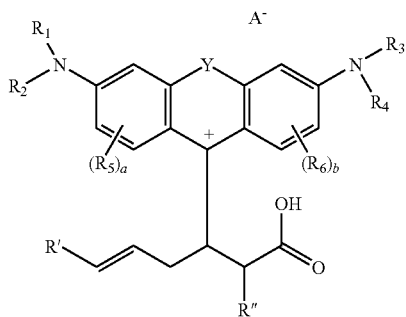

wherein R'=$C_{15}H_{31}$ and R"=H

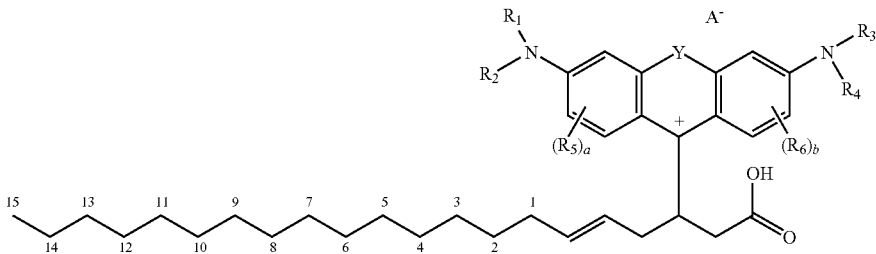

wherein

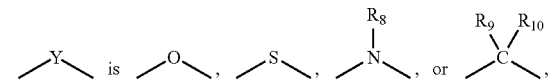

wherein $R_8$, $R_9$, and $R_{10}$ each, independently of the other, is optionally present and wherein, if one or more are present, each of $R_8$, $R_9$, and $R_{10}$ is independently selected from (i) a hydrogen atom, (ii) an alkyl group, (iii) an aryl group, (iv) an arylalkyl group, or (v) an alkylaryl group;

wherein in further embodiments, the number of carbon atoms in $R_1+R_2+R_3++R_5+R_6+R_8+R_9+R_{10}$ is at least about 4, or in another embodiment at least about 16;

wherein R" is optionally present and wherein R' and R", if present, are each independently selected from (i) an alkyl group, (ii) an aryl group, (iii) an arylalkyl group, or (iv) an alkylaryl group, wherein R' or R" are independently selected from linear or branched, saturated or unsaturated, substituted or unsubstituted, or cyclic components, wherein in embodiments at least one of R' or R" is a waxy unit having at least about 5 carbon atoms, or at least about 6 carbon atoms, or at least about 10 carbon atoms, wherein in embodiments, R' or R", if present, are independently selected from an alkyl group containing from about 0 carbon atoms (that is, R" is 0) to about 8 carbon atoms, from about 1 carbon atom to about 8 carbon atoms, or about 18 carbon atoms to about 100 carbons atoms, or about 12 carbon atoms, or about 18 carbon atoms, or about 30 carbon atoms, or about 50 carbon atoms, or about 100 carbon atoms, wherein in embodiments, R' or R", if present, are independently selected from an aryl group containing about 5 carbon atoms, or about 6 carbon atoms, or about 10 carbon atoms, wherein in embodiments R' or R", if present, are independently an alkylaryl group or an arylalkyl group containing about 7 carbon atoms, or about 30 carbon atoms, or about 50 carbon atoms, or about 100 carbon atoms. In one embodiment, R' contains about 18 carbon atoms and R" is 0 carbon atoms;

wherein A is an anion, and wherein CA is either a hydrogen atom or a cation.

In embodiments, A is an anion, with examples of suitable anions including (but not being limited to) $Cl^-$, $Br^-$, $I^-$, $HSO_4^-$, $HSO_3^-$, $SO_4^{2-}$, $SO_3^{2-}$, $CH_3SO_3^-$, $CH_3C_6H_4SO_3^-$, $NO_3^-$, $HCOO^-$, $CH_3COO^-$, $H_2PO_4^-$, $HPO_4^{2-}$, $SCN^-$, $BF_4^-$, $ClO_4^-$, $SSO_3^-$, $PF_6^-$, $SbCl_6^-$, or the like, as well as mixtures thereof.

In embodiments, CA is either a hydrogen atom or a cation with examples of suitable cations including (but not being limited to) alkali metal cations, such as Li+, Na+, K+, Rb+, and Cs+, nonpolymeric or monomeric ammonium and quaternary amine cations, including those of the general formula

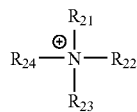

wherein each of $R_{21}$, $R_{22}$, $R_{23}$, and $R_{24}$, independently of the others, is selected from an alkyl group having 1 to 6 carbon atoms.

In one embodiment, the number of carbon atoms in $R_1+R_2+R_3+R_4$ is at least about 4, in another embodiment at least about 16, in another embodiment at least about 18, in yet another embodiment at least about 20, in still another embodiment at least about 22, in another embodiment at least about 24, in yet another embodiment at least about 26, in still another embodiment at least about 28, in another embodiment at least about 30, in yet another embodiment at least about 32, in still another embodiment at least about 34, in another embodiment at least about 36, in yet another embodiment at least about 38, in still another embodiment at least about 40, in another embodiment at least about 42, in yet another embodiment at least about 44, in still another embodiment at least about 46, in another embodiment at least about 48, in yet another embodiment at least about 50, in still another embodiment at least about 52, in another embodiment at least about 54, in yet another embodiment at least about 56, in still another embodiment at least about 58, in another embodiment at least about 60, in yet another embodiment at least about 62, in still another embodiment at least about 64, in another embodiment at least about 66, in yet another embodiment at least about 68, in still another embodiment at least about 70, and in another embodiment at least about 72.

In embodiments, $R_1$, $R_2$, $R_3$, and $R_4$ each, independently of the others, is an alkyl group having from about 0 to about 18 carbon atoms, or from about 0 to about 4, or from about 1 to about 4, or from about 5 to about 18 carbon atoms, an aryl group having from about 6 to about 14 carbon atoms, or from about 6 to about 10, or from about 11 to about 14 carbon atoms, an arylalkyl group (arylalkyl group meaning an aryl group with one or more alkyl substituents) having from about 7 to about 26 carbon atoms, or from about 7 to about 14, or from about 15 to about 26 carbon atoms, or an alkylaryl group (alkylaryl group meaning an alkyl group with one or more aryl substituents) having from about 7 to about 26 carbon atoms, or from about 7 to about 14, or from about 15 to about 26 carbon atoms.

In some specific embodiments wherein

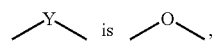

in one embodiment, the number of carbon atoms in $R_1+R_2+R_3+R_4$ is at least about 44, in still another embodiment at least about 46, in another embodiment at least about 48, in yet another embodiment at least about 50, in still another embodiment at least about 52, in another embodiment at least about 54, in yet another embodiment at least about 56, in still another embodiment at least about 58, in another embodiment at least about 60, in yet another embodiment at least about 62, in still another embodiment at least about 64, in another embodiment at least about 66, in yet another embodiment at least about 68, in still another embodiment at least about 70, and in another embodiment at least about 72.

In some specific embodiments wherein

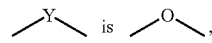

at least one of $R_1$, $R_2$, $R_3$, and $R_4$ is a group of the formula

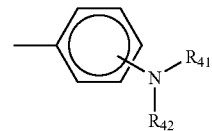

wherein $R_{41}$ and $R_{42}$ each, independently of the other, is (i) an alkyl group (including linear, branched, saturated, unsaturated, cyclic, substituted, and unsubstituted alkyl groups, and wherein hetero atoms, such as oxygen, nitrogen, sulfur, silicon, phosphorus, and the like either may or may not be present in the alkyl group), in one embodiment with at least 1 carbon atom, and in another embodiment with at least about 2 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (ii) an aryl group (including unsubstituted and substituted aryl groups, and wherein hetero atoms, such as oxygen, nitrogen, sulfur, silicon, phosphorus, and the like either may or may not be present in the aryl group), in one embodiment with at least about 6 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iii) an arylalkyl group (including unsubstituted and substituted arylalkyl groups, wherein the alkyl portion of the arylalkyl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkyl group), in one embodiment with at least about 7 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (iv) an alkylaryl group (including unsubstituted and substituted alkylaryl groups, wherein the alkyl portion of the alkylaryl group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylaryl group), in one embodiment with at least about 7 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, wherein one or more of R41 and R42 can be joined together to form a ring, and wherein the substituents on the substituted alkyl, aryl, arylalkyl, and alkylaryl groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, carboxylate groups, carboxylic acid groups, urethane groups, urea groups, mixtures thereof, and the like, wherein two or more substituents can be joined together to form a ring, oligomeric and polymeric cations, such as cationic polymers or oligomers, and the like, as well as mixtures thereof.

In some specific embodiments wherein

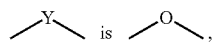

at least one of $R_1$, $R_2$, $R_3$, and $R_4$ is a branched alkyl group having in one embodiment at least about 19 carbon atoms, and in another embodiment at least about 20 carbon atoms.

Since hetero atoms can be included in the alkyl, aryl, arylalkyl, and alkylaryl groups, and since the groups can be substituted, it is to be understood that $R_1$, $R_2$, $R_3$, $R_4$, $R_5$, $R_6$, $R_8$, $R_9$, and $R_{10}$ can also be groups such as alkoxy, polyalkyleneoxy, aryloxy, polyaryleneoxy, arylalkyloxy, polyarylalkyleneoxy, alkylaryloxy, or polyalkylaryleneoxy groups, provided that the oxygen atom in such a group is not directly bonded to a nitrogen, oxygen, or sulfur atom in the

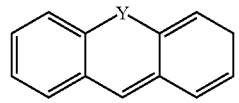

central structure.

Examples of situations wherein one of the R1-4 groups is a cycloalkyl is when

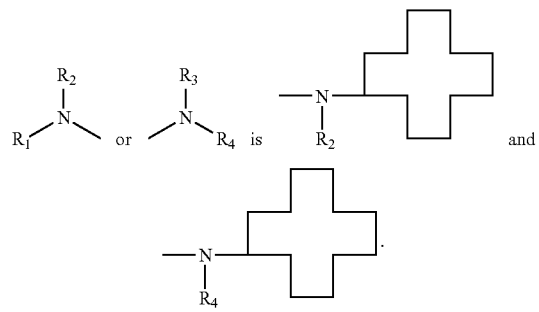

Examples of situations wherein the R1-4 groups are joined together to form a ring are when

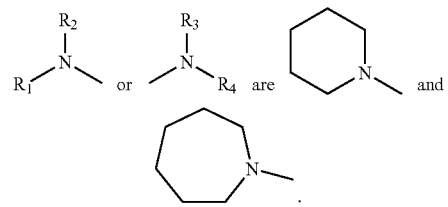

Examples of situations wherein one of the R1-4 groups is joined to a phenyl ring in the central structure is when

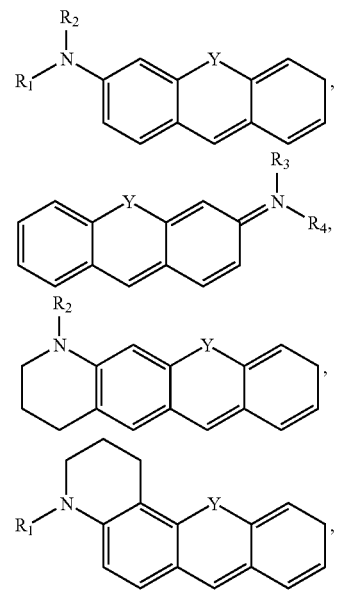

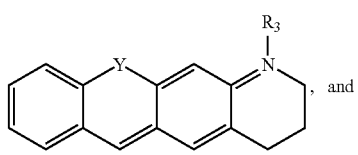, and
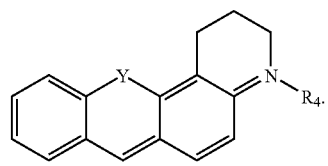
Compounds according to the present disclosure include rhodamines, wherein
—Y— is —O—,
of the general formula
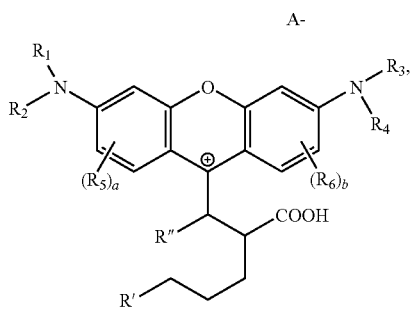
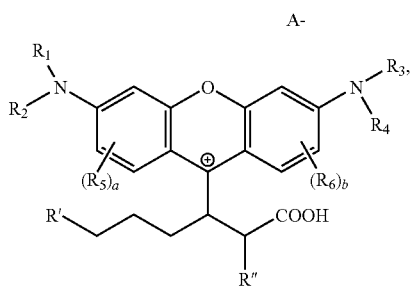
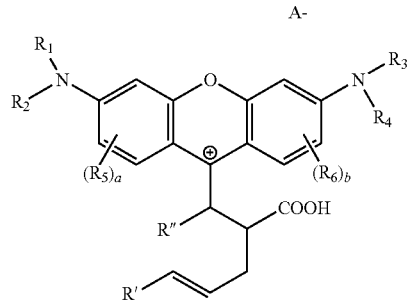
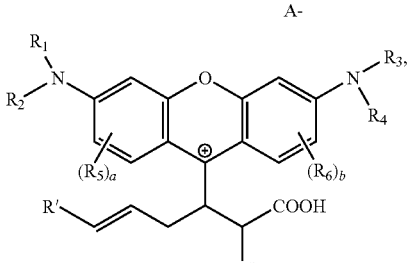
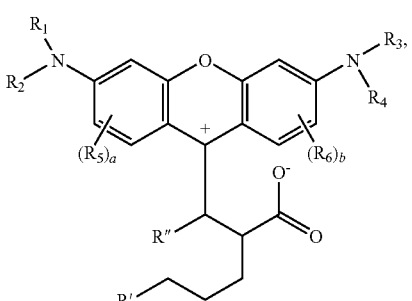
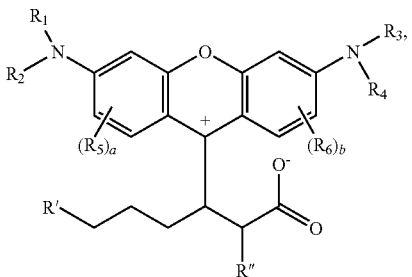
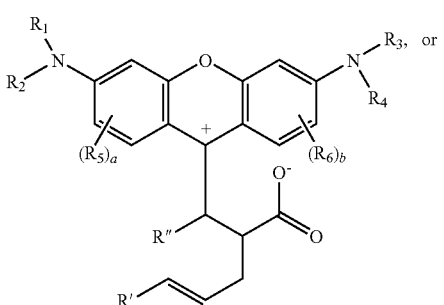
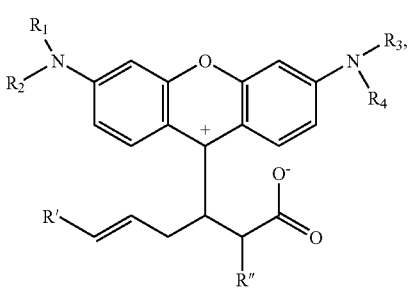
acridines, wherein
—Y— is —N($R_8$)—, of the general formulae

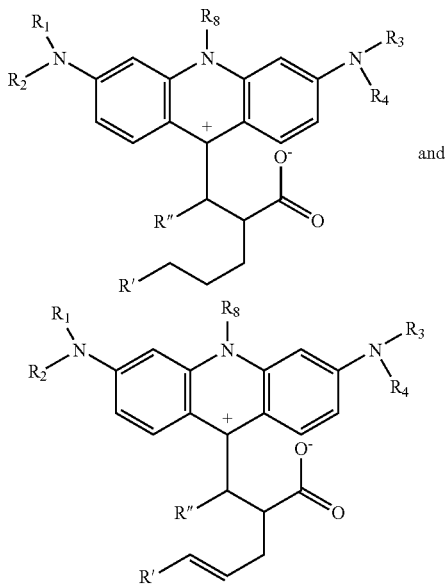

sulforhodamines, wherein

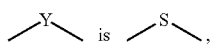 is 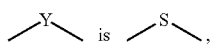, of the general formulae

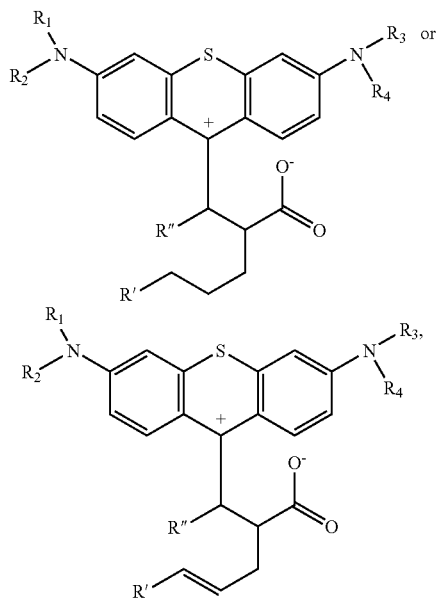

anthracenes, wherein

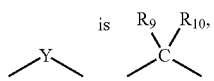

of the general formulae

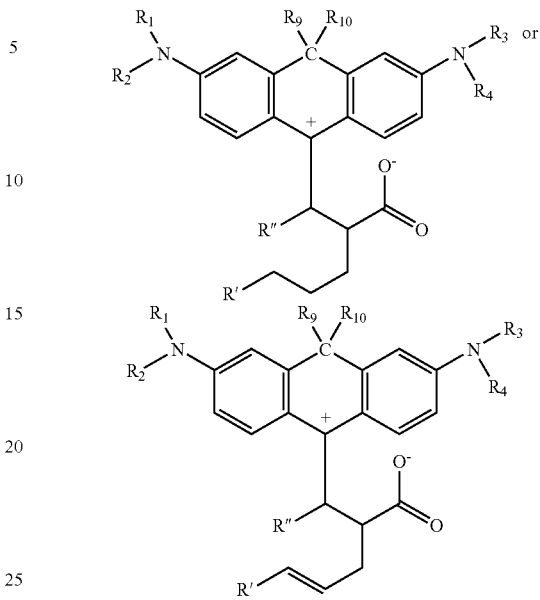

and the like.

In a specific embodiment, the anion A can be an organic dianion of the formula A1-R11-A2 wherein A1 and A2 each, independently of the other, are anionic groups, such as carboxylate, sulfonate, or the like, and wherein R11 is (i) an alkylene group (including linear, branched, saturated, unsaturated, cyclic, substituted, and unsubstituted alkylene groups, and wherein hetero atoms, such as oxygen, nitrogen, sulfur, silicon, phosphorus, and the like either may or may not be present in the alkylene group), in one embodiment with at least 1 carbon atom, in another embodiment with at least about 2 carbon atoms, in yet another embodiment with at least about 6 carbon atoms, in another embodiment with at least about 8 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, (ii) an arylene group (including unsubstituted and substituted arylene groups, and wherein hetero atoms, such as oxygen, nitrogen, sulfur, silicon, phosphorus, and the like either may or may not be present in the arylene group), in one embodiment with at least about 6 carbon atoms, in another embodiment with at least about 10 carbon atoms, and in yet another embodiment with at least about 14 carbon atoms, and in one embodiment with no more than about 26 carbon atoms, in another embodiment with no more than about 22 carbon atoms, and in yet another embodiment with no more than about 18 carbon atoms, although the number of carbon atoms can be outside of these ranges, (iii) an arylalkylene group (including unsubstituted and substituted arylalkylene groups, wherein the alkyl portion of the arylalkylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the arylalkylene group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as benzyl or the like, or (iv) an alkylarylene group (including unsubstituted and substituted alkylarylene groups, wherein the alkyl portion of the alkylarylene group can be linear, branched, saturated, unsaturated, and/or cyclic, and wherein hetero atoms, such as oxygen, nitrogen, sulfur, silicon, phosphorus, and the like either may or may not be present in either or both of the alkyl portion and the aryl portion of the alkylarylene group), in one embodiment with at least about 7 carbon atoms, in another embodiment with at least about 12 carbon atoms, and in yet another embodiment with at least about 18 carbon atoms, and in one embodiment with no more than about 55 carbon atoms, in another embodiment with no more than about 30 carbon atoms, and in yet another embodiment with no more than about 20 carbon atoms, although the number of carbon atoms can be outside of these ranges, such as tolyl or the like, and wherein the substituents on the substituted alkylene, arylene, arylalkylene, and alkylarylene groups can be (but are not limited to) hydroxy groups, halogen atoms, amine groups, imine groups, ammonium groups, cyano groups, pyridine groups, pyridinium groups, ether groups, aldehyde groups, ketone groups, ester groups, amide groups, carbonyl groups, thiocarbonyl groups, sulfate groups, sulfonate groups, sulfonic acid groups, sulfide groups, sulfoxide groups, phosphine groups, phosphonium groups, phosphate groups, nitrile groups, mercapto groups, nitro groups, carboxylate groups, carboxylic acid groups, urethane groups, urea groups, mixtures thereof, and the like, wherein two or more substituents can be joined together to form a ring. Examples of suitable organic dianions include unsubstituted and substituted naphthalene disulfonates, unsubstituted and substituted benzene disulfonates, and the like, as well as mixtures thereof.

In another specific embodiment, the anion A can be an organic trianion, tetraanion, and higher, an oligomeric and polymeric anion, such as a polysulfonate or polycarboxylate, or the like.

In one embodiment, colorants according to the present disclosure are of the formula

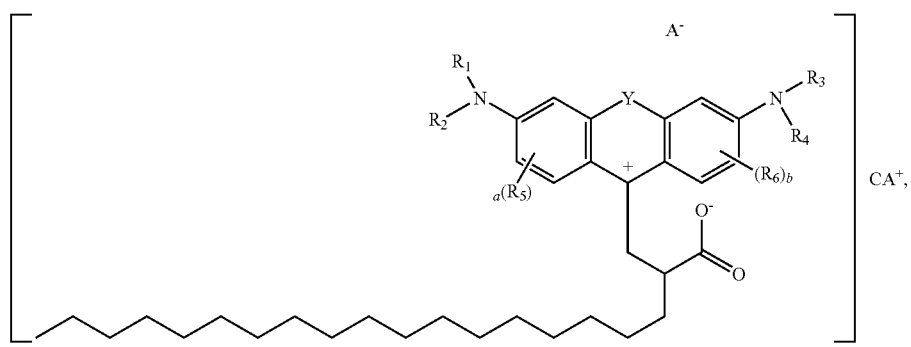

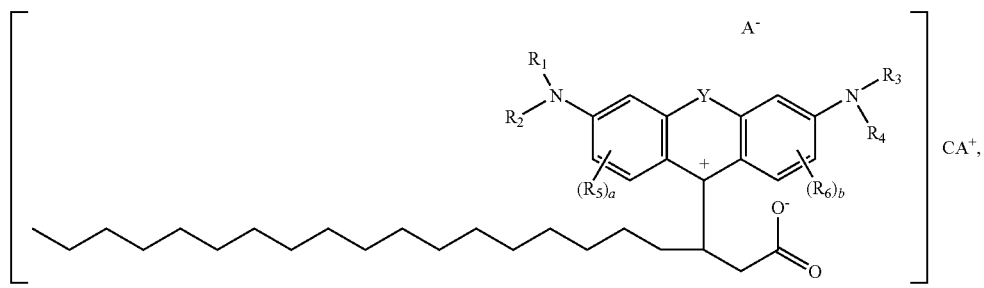

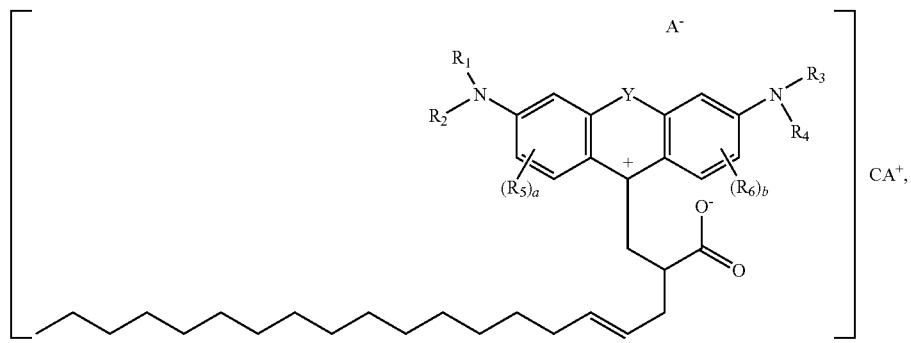

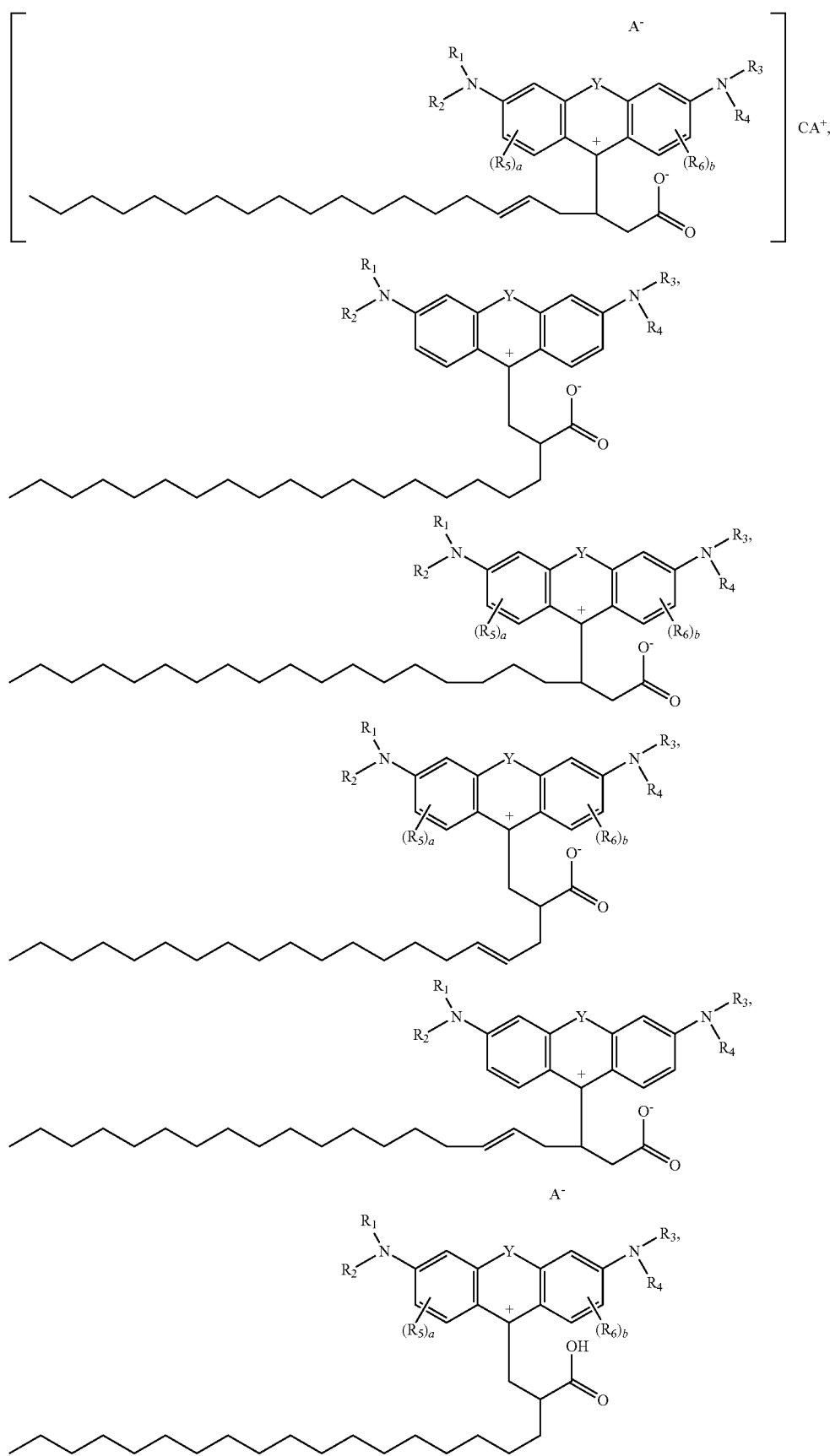

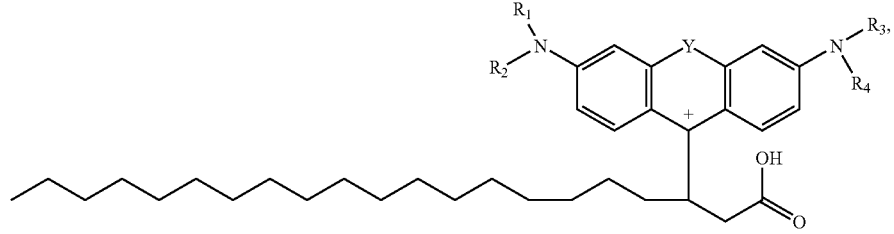
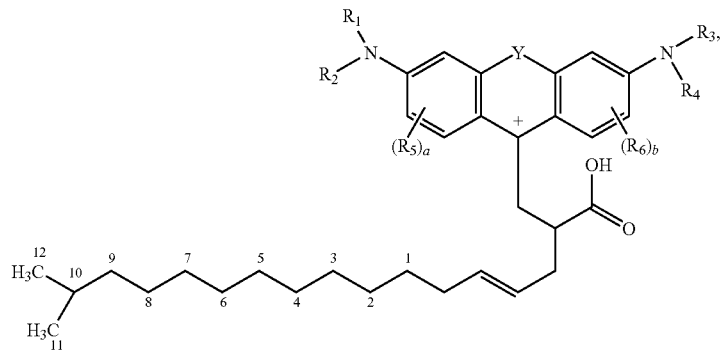
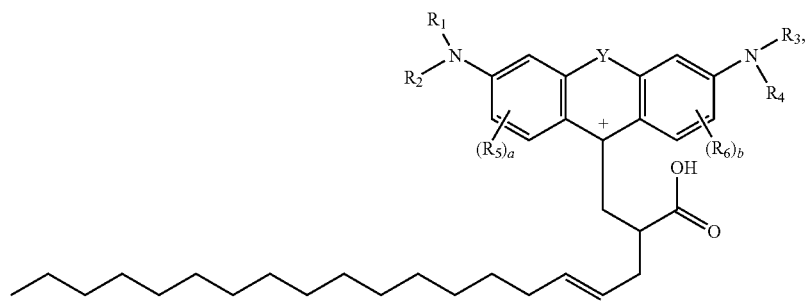
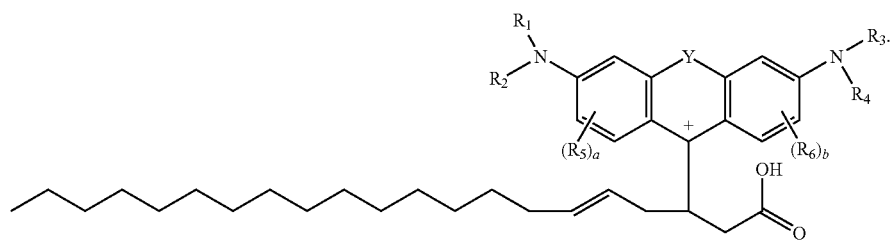
In one specific embodiment, colorants according to the present disclosure are of the formula
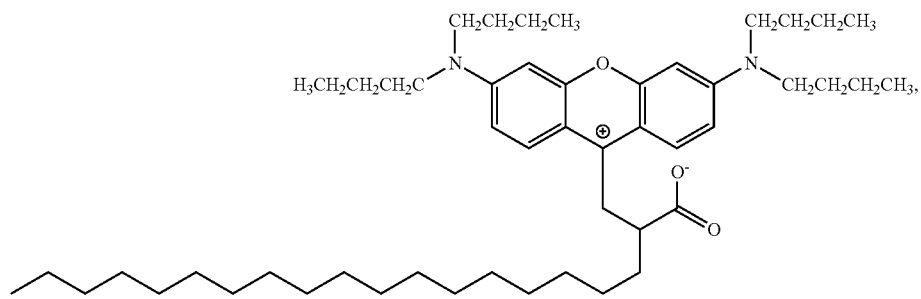

-continued

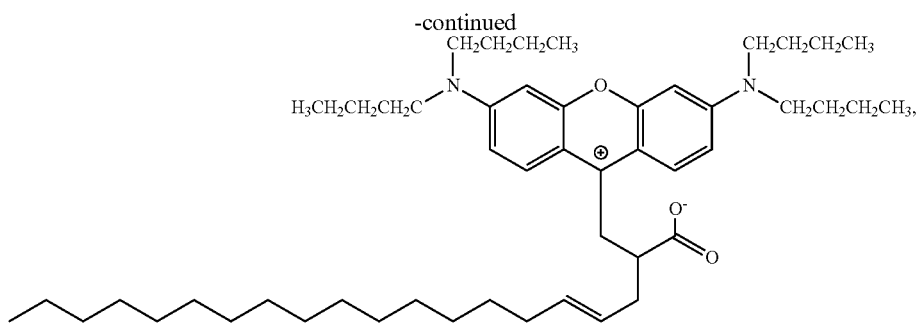

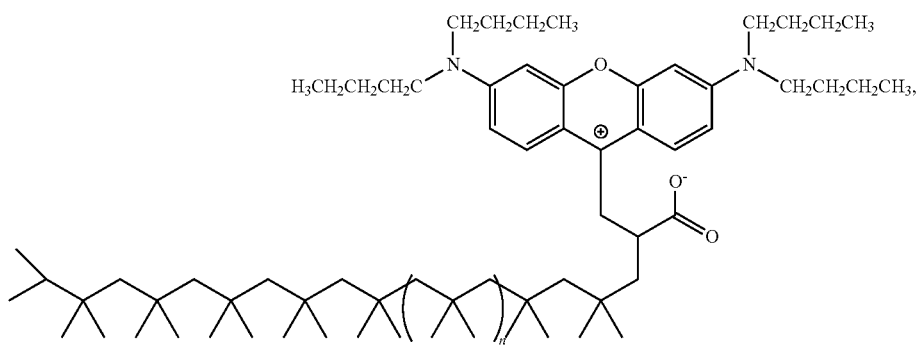

wherein n is 7.

It is to be understood that all possible tautomeric forms of these colorants are included within the above formulae. Colorants of the present disclosure can be prepared by any desired or effective procedure.

For example, a succinic anhydride copolymer of the formula

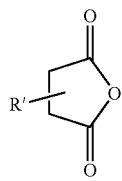

having the desired R' groups as defined herein can be admixed with one or more aminophenols (for example, N,N-diethylaminophenol, MW=165, available from Aldrich Chemical Corp., N,N-dibutylphenol, MW=221 available from TCI America, and the like) of the formula

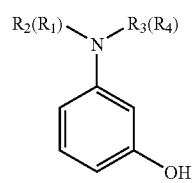

having the desired $R_1$, $R_2$, $R_3$, and $R_4$ groups, etc., thereon, with the $R_1$, $R_2$, $R_3$, and $R_4$ groups, etc., selected as defined for the colorant herein, heated, either neat or, optionally, in the presence of a solvent, after which an acid is added, for example conc. $H_2SO_4$ with additional heating.

In embodiments, a process herein can include reacting a succinic anhydride copolymer of the formula

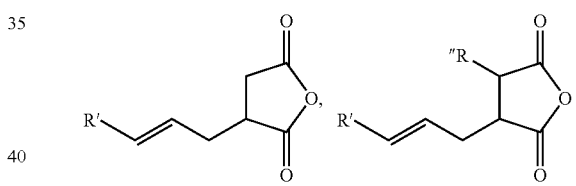

having the desired R', R'' groups as defined herein with one or more aminophenols of the formula

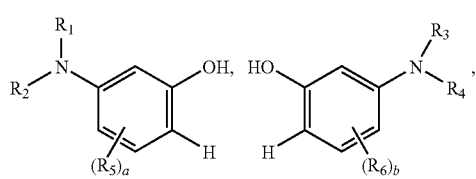

having the desired $R_1$, $R_2$, $R_3$, and $R_4$ groups, etc., thereon, with the $R_1$, $R_2$, $R_3$, and $R_4$ groups, etc., selected as defined for the colorant herein, to arrive at a colorant having the structure

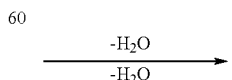

1) ~180° C. 2-3 hours
2) $H_2SO_4$
3) 190° C. 2 hours
4) caustic workup

-continued

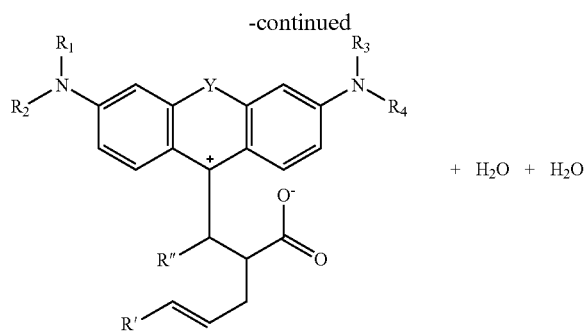

wherein R', R" are as described herein.

Alternately, a process herein can include reacting a succinic anhydride copolymer of the formula

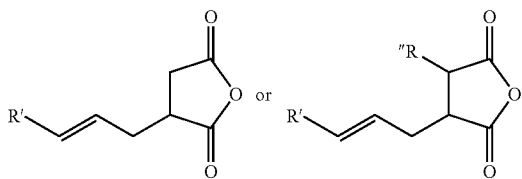

having the desired R', R" groups as defined herein with one or more aminophenols of the formulae

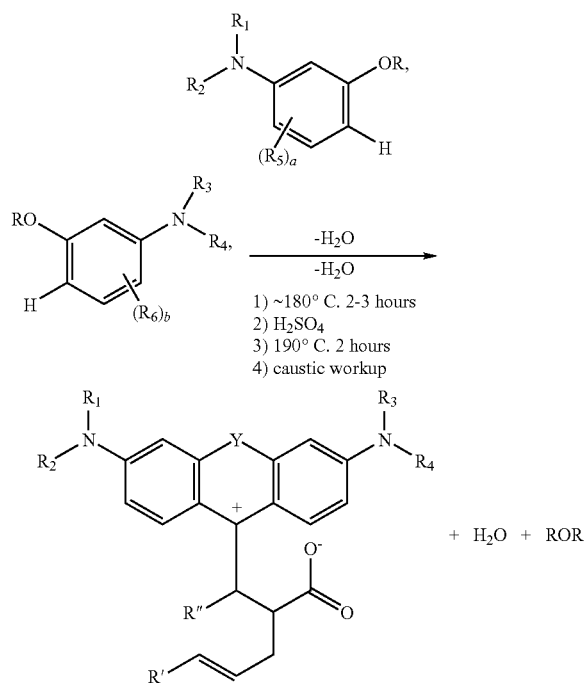

See, for example, U.S. Pat. No. 5,331,097, which is hereby incorporated by reference herein, for examples wherein R is not hydrogen. U.S. Pat. No. 5,331,097 describes describing synthesis of a rhodamine type xanthene colorant from an N-poly(oxyalklyene)-m-alkoxyaniline or N,N-bis-((poly-oxyalkylene))-m-alkoxyaniline intermediate. The alkoxy group, preferably C1-C4 alkoxy, is resistant to substitution by the monomer units which constitute the poly(oxyalkylene) chain and react with the amino group of the intermediate. The colorant has at least one, and preferably two, poly(oxyalkylene) substituents characterized as having a straight or branched polymer chain of at least 3 monomer units selected from ethylene oxide, propylene oxide, butylene oxide and glycidol. In one embodiment, two moles of N,N-bis(poly(oxyalkylene))-m-alkoxyaniline are reacted with benzaldehyde or derivatives thereof. The resulting rhodamine type colorant is provided with up to four poly(oxyalkylene) substituents, two on each amino group of the colorant. It should be noted that when benzaldehyde or derivatives thereof are used, an oxidation step is required to produce the colorant. In an alternate embodiment of U.S. Pat. No. 5,331,097, a non-polymeric intermediate, such as mono- or di-, alkyl or aryl substituted m-aminophenol, is provided in place of one of the polymeric intermediates. The non-polymeric intermediate, for example N,N-diethyl-m-aminophenol, may be first reacted with phthalic anhydride according to the procedure disclosed in U.S. Pat. No. 3,769,302, Example A, hereby incorporated by reference herein in its entirety. Next, a polymeric intermediate, N,N-bis(poly(oxyalkylene))-m-alkoxyaniline, is reacted with the adduct of step one to make a colorant. The resulting colorant would have only one amino group substituted with poly(oxyalkylene). See U.S. Pat. No. 5,331,097 for further detail.

In embodiments herein, $R_5$ and $R_6$ can be the same or different. For example, embodiments wherein $R_5$ and $R_6$ are different can be synthesized by initial formation of the dialkylamino-hydroxy-benzoyl-benzoic acid adduct followed by addition of a subsequent meta-aminophenol adduct.

In embodiments, the succinic anhydride copolymer can be selected from

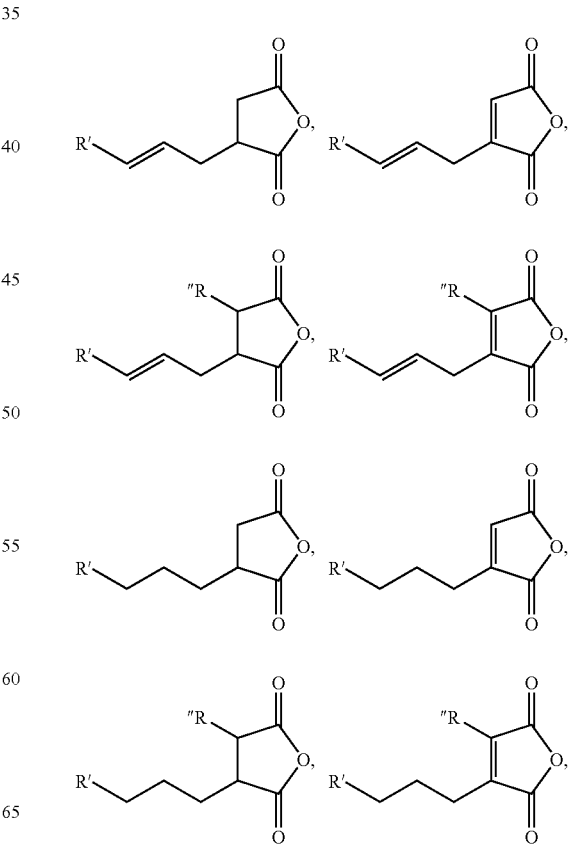

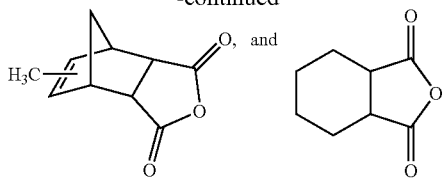

The succinic anhydride copolymer and the aminophenol are present in any desired or effective relative amounts, in one embodiment at least about 0.5 mole of succinic anhydride copolymer per every 2 moles of aminophenol, in another embodiment at least about 0.9 mole of succinic anhydride copolymer per every 2 moles of aminophenol, and in yet another embodiment at least about 1 mole of succinic anhydride copolymer per every 2 moles of aminophenol, and in one embodiment no more than about 1.9 moles of succinic anhydride copolymer per every 2 moles of aminophenol, in another embodiment no more than about 1.5 moles of succinic anhydride copolymer per every 2 moles of aminophenol, and in yet another embodiment no more than about 1.1 moles of succinic anhydride copolymer per every 2 moles of aminophenol, although the relative amounts can be outside of these ranges.

In embodiments, compounds herein include those wherein $R_5$ and $R_6$ are the same or different. For example, If desired, the reaction can be run neat, in the absence of a solvent. In addition, if desired, the reaction can be run in the presence of an optional solvent. Examples of suitable solvents include tetramethylene sulfone (sulfolane), N-methylpyrrolidone, dimethyl formamide, dimethyl sulfoxide, octanol, or the like, as well as mixtures thereof. When present, the optional solvent is present in any desired or effective amount, in one embodiment at least about 1 liter per every 0.1 mole of succinic anhydride copolymer, in another embodiment at least about 1 liter per every 0.3 mole of succinic anhydride copolymer, and in yet another embodiment at least about 1 liter per every 0.35 mole of succinic anhydride copolymer, and in one embodiment no more than about 1 liter per every 2 moles of succinic anhydride copolymer, in another embodiment no more than about 1 liter per every 1.5 moles of succinic anhydride copolymer, and in yet another embodiment no more than about 1 liter per every 1 mole of succinic anhydride copolymer, although the relative amounts can be outside of these ranges.

The mixture of succinic anhydride copolymer, aminophenol, and optional solvent is then heated to any effective temperature, in one embodiment at least about 62° C., in another embodiment at least about 150° C., and in yet another embodiment at least about 190° C., and in one embodiment no more than about 280° C., in another embodiment no more than about 220° C., and in yet another embodiment no more than about 200° C., although the temperature can be outside of these ranges.

The mixture of succinic anhydride copolymer, aminophenol, and optional solvent is heated for any effective period of time, in one embodiment at least about 5 minutes, in another embodiment at least about 2 hours, and in yet another embodiment at least about 3 hours, and in one embodiment no more than about 4 days, in another embodiment no more than about 60 hours, and in yet another embodiment no more than about 40 hours, although the time can be outside of these ranges.

An acid is then added and the mixture heated for any to any effective temperature, in one embodiment at least about 62° C., in another embodiment at least about 150° C., and in yet another embodiment at least about 190° C., and in one embodiment no more than about 280° C., in another embodiment no more than about 220° C., and in yet another embodiment no more than about 200° C., although the temperature can be outside of these ranges.

The mixture of succinic anhydride copolymer, aminophenol, optional solvent, and acid is heated for any effective period of time, in one embodiment at least about 5 minutes, in another embodiment at least about 1 hour, in another embodiment at least about 2 hours, and in yet another embodiment at least about 3 hours, and in one embodiment no more than about 4 days, in another embodiment no more than about 60 hours, and in yet another embodiment no more than about 40 hours, although the time can be outside of these ranges.

If desired, the resulting product can be purified by pouring the reaction mixture into an organic non-water-soluble and non-water-miscible solvent in which the product is soluble or miscible and in which undesirable salt byproducts are not soluble, such as methanol, methyl isobutyl ketone, toluene, hexane, heptane, or the like, followed by admixing the solvent containing the product with water in a separatory funnel and separating the aqueous and organic phases.

The crude product can then, if desired, be further purified by washing it with aqueous EDTA to remove metal salts, followed by washing with water. If desired, a titration or other instrumental technique, such as AA (atomic absorption) or ICP (inductively coupled plasma) can be performed to determine if the metal salts have been completely removed. The purified product can be isolated by distilling off any solvents.

Various substituents can be placed on the rings of the colorants of the present invention by any desired or effective method, such as, for example, the methods disclosed in U.S. Pat. No. 5,847,162 and U.S. Pat. No. 1,991,482, the disclosures of each of which are totally incorporated herein by reference. See for example, U.S. Pat. No. 7,176,317, and U.S. Pat. No. 6,860,931, the disclosures of each of which are hereby totally incorporated by reference herein.

See also, for example, U.S. Pat. No. 5,331,097, which is hereby incorporated by reference in its entirety. Further, for an alternate method for making rhodamines, see U.S. Pat. No. 6,869,931, which is hereby incorporated by reference in its entirety.

EXAMPLES

The following Examples are being submitted to further define various species of the present disclosure. These Examples are intended to be illustrative only and are not intended to limit the scope of the present disclosure. Also, parts and percentages are by weight unless otherwise indicated. Other synthetic processes can also be used.

Example 1

Synthesis of Octadecyl Succinic Anhydride Based Rhodamine

To a 100 milliliter beaker equipped with a Teflon® coated magnet, condenser and oil bath was charged 9.4 grams of octadecyl succinic anhydride (352 MW) of the formula

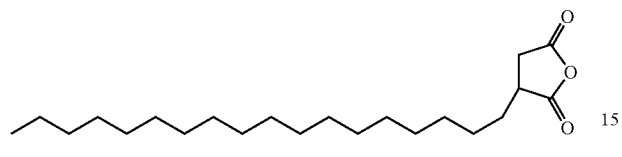

and 11.8 grams N,N-dibutyl-m-aminophenol a 221 MW aminophenol obtained from TCI America) of the formula

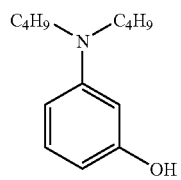

The beaker was placed in a 160° C. oil bath and stirring was initiated. After several minutes, the contents of the beaker began to turn red. After one hour at 160 C, about 1.14 grams concentrated sulfuric acid with 0.43 grams of water were added drop-wise. After 20 minutes of additional heating, the contents were poured into a sodium hydroxide solution containing 0.8 grams NaOH and 88 grams water. An oily product precipitated out. About 100 milliliters of methylene chloride was added to the contents to extract the product from the water. The methylene chloride layer was then run through a silica gel plug. The dye adsorbed strongly to the gel and brown light red solvent went through the plug. Methanol was sued to chase the color off of the plug. The methanol was then evaporated yielding the magenta waxy solid. The Zwitterionic form of this colorant is believed to be of the formula Other synthetic processes can also be used.

Example 2

To a 100 milliliter beaker equipped with a Teflon® coated magnet, condenser and oil bath was charged 19.9 grams octadecenyl succinic anhydride (352 MW available from Humphry Chemical Co.) of the formula

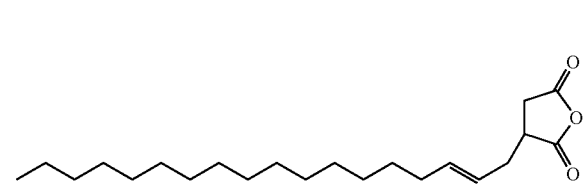

And 25 grams of N,N-dibutyl-m-aminophenol (221 MW, available from TCI America) of the formula

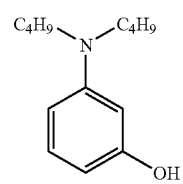

The beaker was placed in a 150° C. oil bath and stirring was initiated. After several minutes, the contents of the beaker began to turn red. After one hour at 150° C., a solution containing about 2.85 grams concentrated sulfuric acid with 1.1 grams of water were added drop-wise. After 20 minutes of additional heating, the contents were poured into a sodium hydroxide solution containing 2.2 grams of NaOH and 220 grams of water. An oily product precipitated out. About 100 milliliters of toluene was added to the contents to extract the product from water. The toluene layer was placed in a separatory funnel and washed with water and then run through a silica gel plug. The dye adsorbed strongly to the gel and brown light red solvent went through the plug. Methanol was used to chase the color off the plug. The solvent was then evaporated yielding the magenta waxy solid. The Zwitterionic form of this colorant is believed to be of the formula

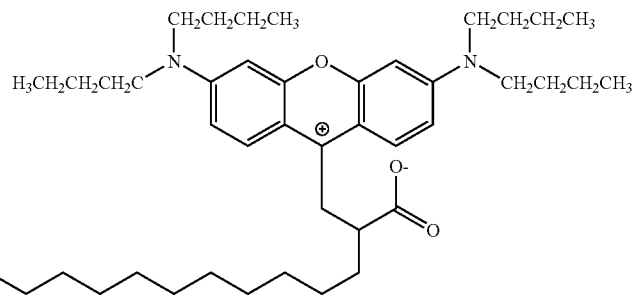

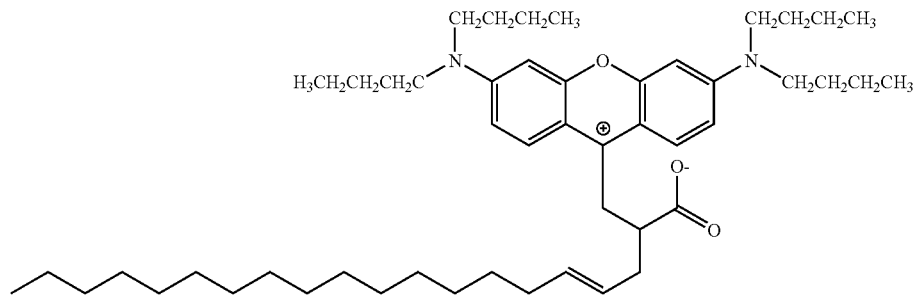

Example 3

Synthesis of Octadecenyl Succinic Anhydride Based Rhodamine

To 200 milliliter beaker equipped with a Teflon® coated magnet, condenser and oil bath was charged 100 grams of polyisobutylene based succinic anhydride (OLOA 15500 cut with mineral oil to 50%, 1000 MW, available from Chevron Oronite Co. LLC) of the formula

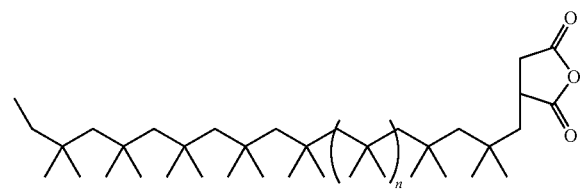

wherein is 7. The beaker was placed in a 130° C. oil bath and stirring was initiated. Once the OLOA 15500 was at a suitable temperature, about 130° C., stirring was initiated with the stir magnet. After several minutes, about 22 grams of N,N-dibutyl-m-aminophenol (221 MW, available from TCI America) of the formula

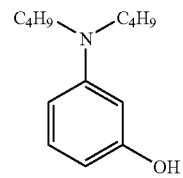

Was added to the beaker and the temperature of the oil bath was raised to 150° C. After about 15 minutes, the contents of the beaker began to turn red and eventually a very deep magenta. The contents were heated and stirred at 150° C. for about 2.5 hours. After about 2.5 hours, 4.6 grams of $H_2SO_4$ was added (vigorous bubbling was observed) and the contents stirred for an additional 15 minutes and finally quenched into a 1 liter beaker containing 700 milliliters of methanol. The methanol was decanted off leaving the product which was a viscous magenta oil. The Zwitterionic form of this colorant is believed to be of the formula

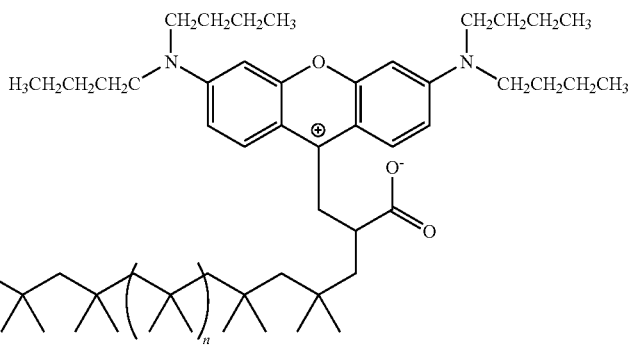

wherein n is 7.

Example 4

Preparation of an Ink Base

An ink base was prepared by melting, admixing, and filtering the following ingredients:

43.59 parts by weight polyethylene wax (PE 655®, obtained from Baker Petrolite) of the formula $CH_3(CH_2)_{50}CH_3$;

19.08 parts by weight stearyl stearamide wax (KEMAMIDE® S-180, obtained from Crompton Corporation);

18.94 parts by weight tetra-amide resin obtained from the reaction of one equivalent of a C-36 dimer acid (obtained from Uniqema, New Castle, Del.) with two equivalents of ethylene diamine and UNICID® 700 (obtained from Baker Petrolite), a long chain hydrocarbon having a terminal carboxylic acid group, prepared as described in Example 1 of U.S. Pat. No. 6,174,937, which is hereby incorporated by reference herein in its entirety;

11.71 parts by weight urethane resin obtained from the reaction of two equivalents of ABITOL® E hydroabietyl alcohol (obtained from Hercules Inc.) and one equivalent of isophorone diisocyanate, prepared as described in Example 1 of U.S. Pat. No. 5,782,966, which is hereby incorporated by reference herein;

6.48 parts by weight urethane resin that is the adduct of three equivalents of stearyl isocyanate and a glycerol-based alcohol, prepared as described in Example 4 of U.S. Pat. No. 6,309,453, which is hereby incorporated by reference herein in its entirety;

0.20 parts by weight NAUGUARD® 445 antioxidant (obtained from Uniroyal Chemical Co.).

Thereafter, 600 grams of the ink carrier components as listed above in the percentages as listed above were added to a 1 liter beaker and heated in an oven at 135° C. until molten. Subsequently, the beaker was inserted into a heating mantle set to 135° C. and the contents of the beaker were stirred for 45 minutes. The resulting ink was then filtered through a combination of Whatman #3 and 0.2 micron NAE filters and placed in a Mott filter assembly. Filtration was supported by the addition of 1 percent by weight FILTER-AID obtained from Fluka Chemika, and proceeded at a temperature of 135 C until complete after 6 hours. The ink base was poured into molds containing about 31 grams of the colorless ink base and allowed to cool.

Example 5

Preparation of Ink Containing Colorant

About 30.0 grams of ink base from Example 4 was placed in a 100 milliliter beaker with a magnetic stir bar and subsequently placed in a 135 C oil bath until molten. About 2.0 grams of the product of Example 1 was then added and stirred for about 3 hours. The magenta colorant was then poured into an aluminum mold. This process was repeated in the same amounts for the products of Examples 2 and 3.

Example 6

Printing of Ink Samples Containing Colorant

Printed samples of the inks prepared in Example 5 were generated on HAMMERMILL LASERPRINT® paper using a K Printing Proofer (manufactured by RK Print Coat Instrument Ltd., Litlington, Royston, Heris, SG8 0OZ, U.K.). In this method, the tested inks were melted onto a printing plate set at 150° C. temperature. A roller bar fitted with the paper was then rolled over the plate containing the melted ink on its surface. The ink on the paper was cooled, resulting in three separated images of rectangular blocks. The most intensely colored block contained the most ink deposited on the paper, and was therefore used to obtain the color value measurements. The printed samples were evaluated visually.

Example 7

Synthesis of Octadecyl Succinic Anhydride Based Rhodamine Intermediate
(Dibutylamino-hydroxy-benzoyl Benzoic Acid)

To a 200 milliliter beaker equipped with a Teflon® coated magnet, condenser and oil bath is charged 50 grams of octadecyl succinic anhydride (352 MW) of the formula

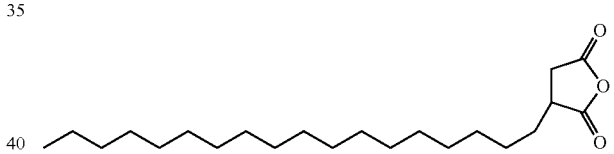

and 80 grams of chlorobenzene. The beaker is placed in a 60° C. oil bath and stirring is initiated—the anhydride dissolves After about 30 minutes at 60° C., about 31.0 grams of N,N-dibutyl-m-aminophenol (a 221 MW aminophenol obtained from TCI America) of the formula (below) is added and the temperature increased to 100° C. and stirred. After about 3 hours, the temperature of the oil bath is allowed to cool to room temperature and the product precipitates out

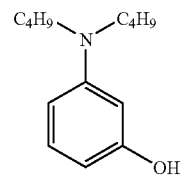

The reaction product is then filtered through a Buchner funnel and the solid is washed with 500 milliliters of hot water followed by 500 milliliters of cold water and the solid is allowed to air dry. The Dibutylamino-hydroxy-benzoyl benzoic acid adduct is believed to be of the formula (Theoretical yield=80.0 g)

Example 8

To a 500 milliliter beaker equipped with a Teflon® coated magnet, condenser and oil bath is charged 80 grams of the intermediate (Dibutylamino-hydroxy-benzoyl benzoic acid) made in Example 7, 23.2 grams of N,N-diethyl-m-aminophenol

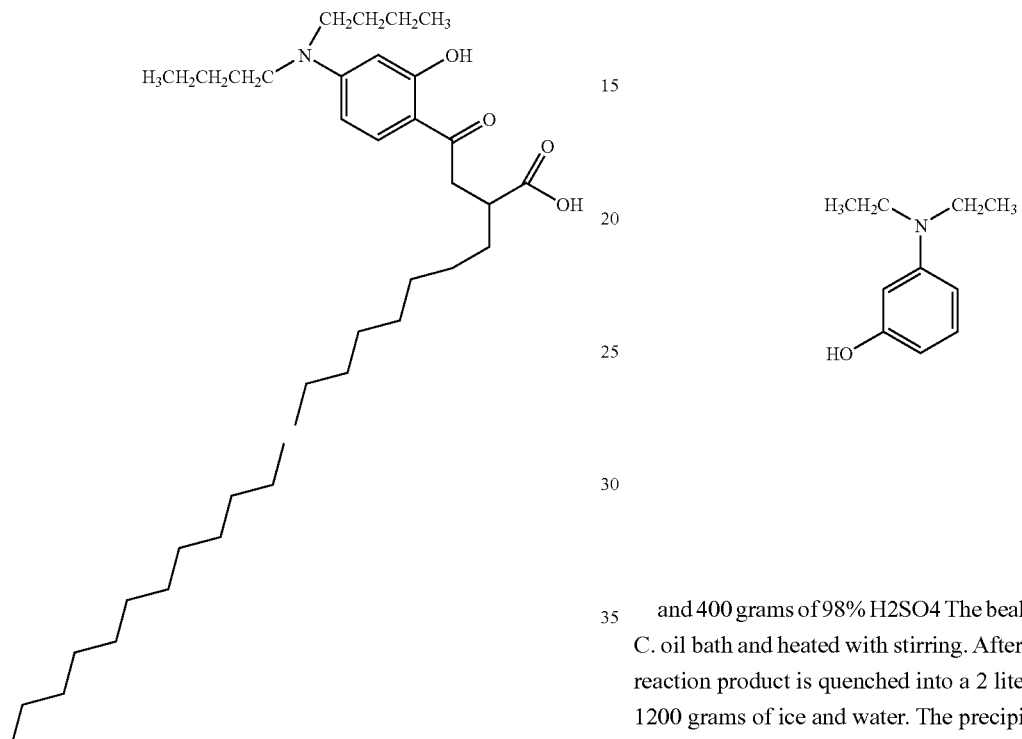

and 400 grams of 98% H2SO4 The beaker is placed in a 55° C. oil bath and heated with stirring. After about 24 hours, the reaction product is quenched into a 2 liter beaker containing 1200 grams of ice and water. The precipitate is collected via vacuum filtration and is allowed to dry. The structure of the unsymmetrical red/magenta solid is believed to be of the formula

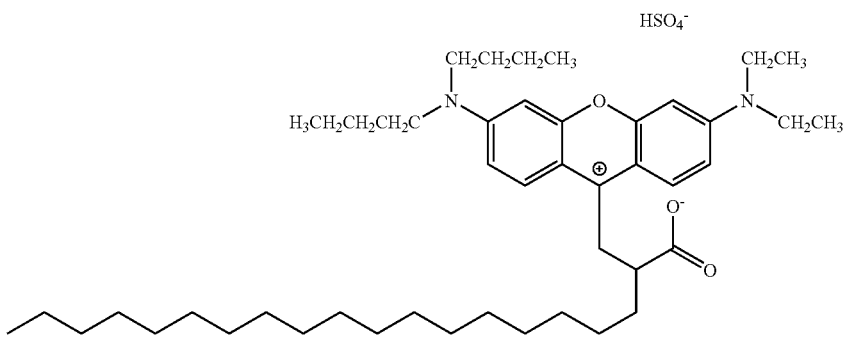

Example 9

To a 500 milliliter beaker equipped with a Teflon® coated magnet, condenser and oil bath is charged 80 grams of the intermediate (Dibutylamino-hydroxy-benzoyl benzoic acid) made in Example 7, 21.2 grams of 3-(ethylamino)-p-cresol (available from the Aldrich Chemical Corp)

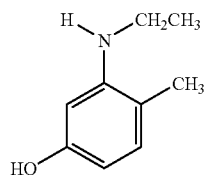

and 400 grams of 98% H2SO4 The beaker is placed in a 55° C. oil bath and heated with stirring. After about 24 hours, the reaction product is quenched into a 2 liter beaker containing 1200 grams of ice and water. The precipitate is collected via vacuum filtration and is allowed to dry. The structure of the unsymmetrical red/magenta solid is believed to be of the formula

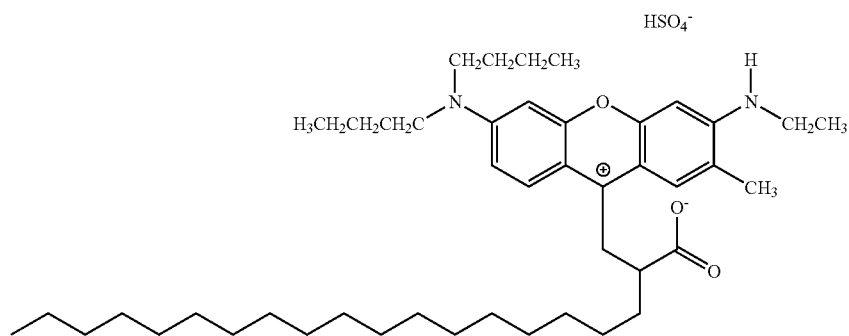

Example 10

To a 500 milliliter beaker equipped with a Teflon® coated magnet, condenser and oil bath is charged 80 grams of the intermediate (Dibutylamino-hydroxy-benzoyl benzoic acid) made in Example 7, 22.0 grams of 6-chloro-m-anisidine (available from the Aldrich Chemical Corp)

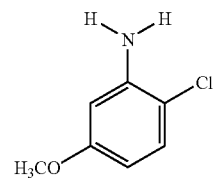

and 400 grams of 98% $H_2SO_4$ The beaker is placed in a 55° C. oil bath and heated with stirring. After about 24 hours, the reaction product is quenched into a 2 liter beaker containing 1200 grams of ice and water. The precipitate is collected via vacuum filtration and is allowed to dry. The structure of the unsymmetrical red/magenta solid is believed to be of the formula

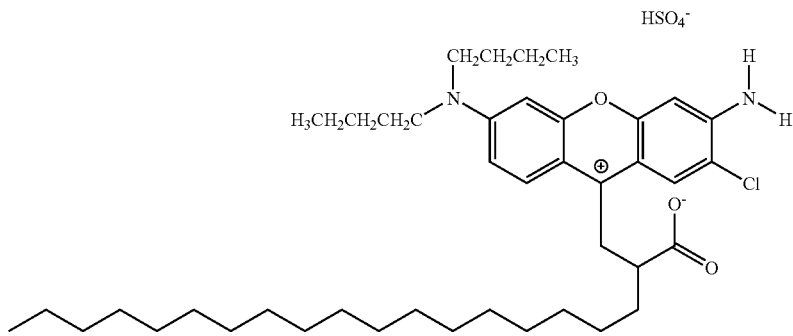

Example 11

To a 500 milliliter beaker equipped with a Teflon® coated magnet, condenser and oil bath is charged 80 grams of the intermediate (Dibutylamino-hydroxy-benzoyl benzoic acid) made in Example 7, 26.8 grams of 3-methoxy-5-(trifluoromethyl) aniline (available from the Aldrich Chemical Corp)

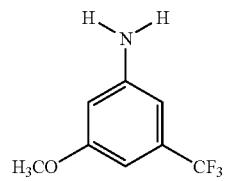

and 400 grams of 98% $H_2SO_4$. The beaker is placed in a 55° C. oil bath and heated with stirring. After about 24 hours, the reaction product is quenched into a 2 liter beaker containing 1200 grams of ice and water. The precipitate is collected via vacuum filtration and is allowed to dry. The structure of the unsymmetrical red/magenta solid is believed to be of the formula

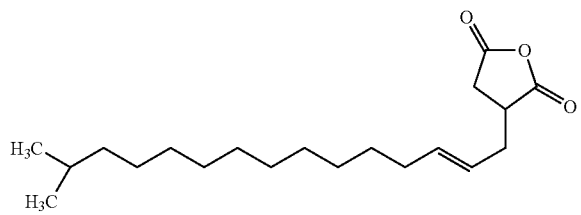

and 20 grams of N,N-dibutyl-m-aminophenol (221 MW, available from TCI America) of the formula

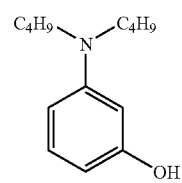

The flask was placed in a 150° C. oil bath and stirring was initiated. After several minutes, the contents of the beaker began to turn red. After one hour at 150° C., a solution began to turn red. After one hour at 150° C., a solution

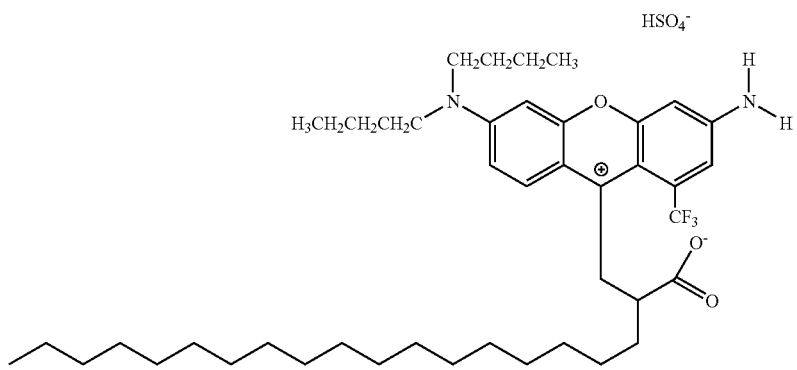

Example 12

To a 100 milliliter flask equipped with a Teflon® coated magnet, condenser and oil bath was charged 14.8 grams isohexadecenyl succinic anhydride (327 MW available from Humphry Chemical Co.) of the formula containing about 2.28 grams concentrated sulfuric acid with 0.9 grams of water were added drop-wise. After 20 minutes of additional heating, the contents were poured into a sodium hydroxide solution containing 1.7 grams of NaOH and 176 grams of water. An oily product precipitated out. The Zwitterionic form of this colorant is believed to be of the formula

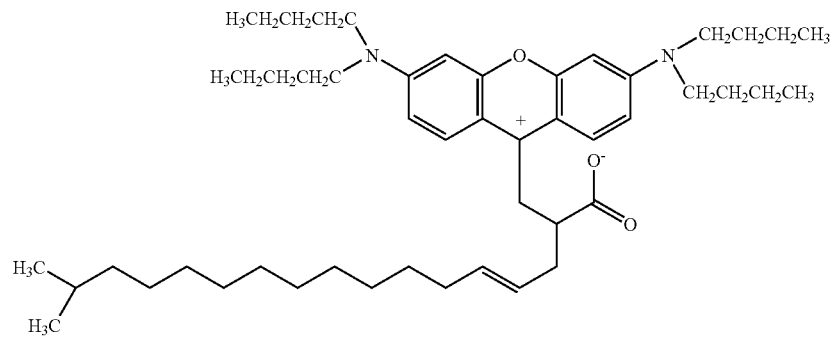

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A compound of the formula

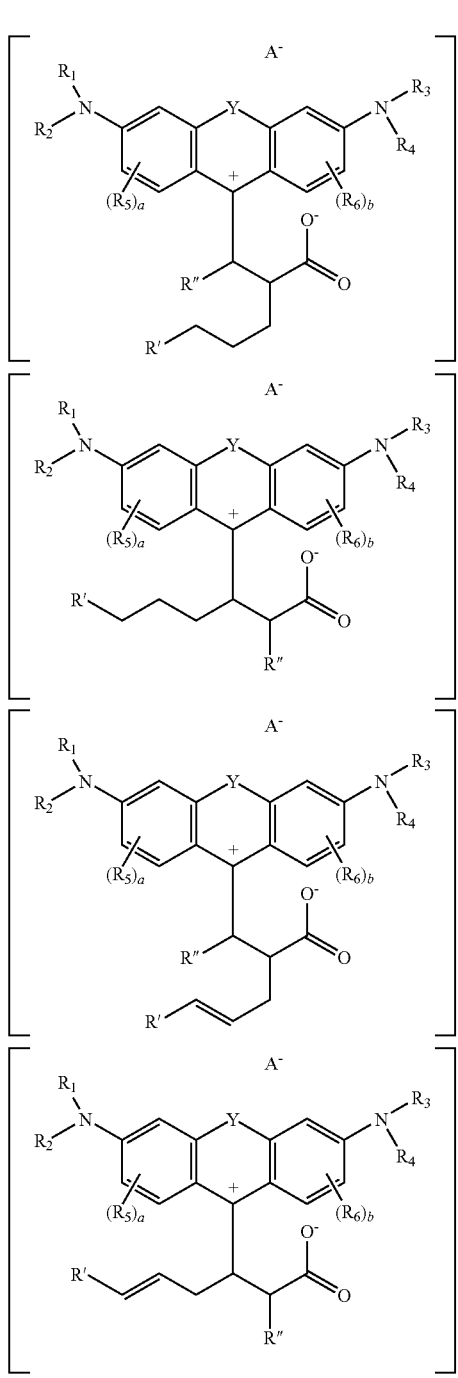

-continued

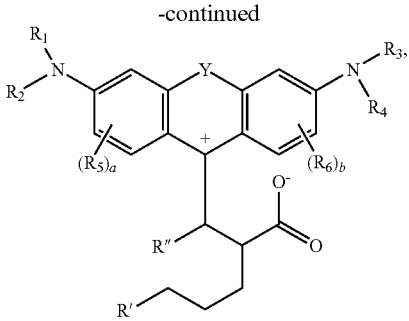

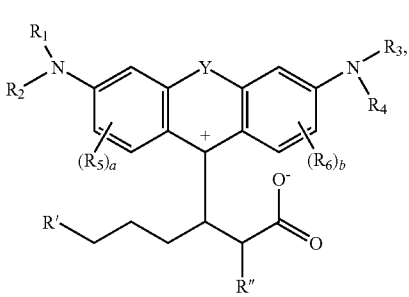

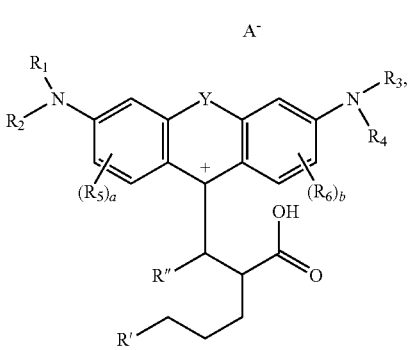

-continued

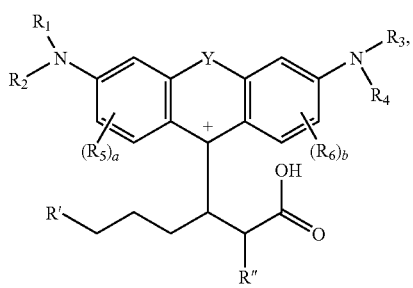

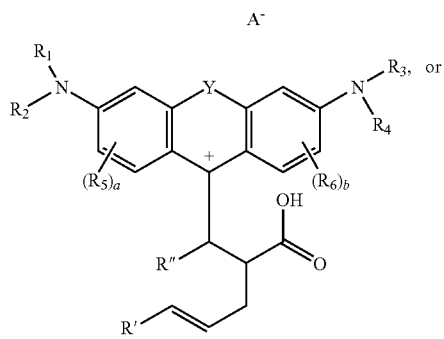

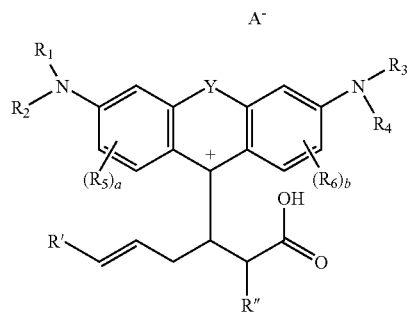

wherein $R_1$, $R_2$, $R_3$, and $R_4$ each, independently of the others, is (i) a hydrogen atom, (ii) an alkyl group, (iii) an aryl group, (iv) an arylalkyl group, or (v) an alkylaryl group, wherein $R_1$ and $R_2$ can be joined together to form a ring, wherein $R_3$ and $R_4$ can be joined together to form a ring, and wherein $R_1$, $R_2$, $R_3$, and $R_4$ can each be joined to a phenyl ring in the central structure; wherein a and b each, independently of the others, is an integer which is 0, 1, 2, or 3;

wherein $R_5$ and $R_6$ are each optionally present and wherein each of $R_5$ and $R_6$ independently of the other, if present, are independently selected from (i) an alkyl group, (ii) an aryl group, (iii) an arylalkyl group, (iv) an alkylaryl group, (v) a halogen atom, (vi) an ester group, (vii) an amide group, (viii) a sulfone group, (ix) an amine group or ammonium group, (x) a nitrile group, (xi) a nitro group, (xii) a hydroxy group, (xiii) a pyridine or pyridinium group, (xiv) an ether group, (xv) a ketone group, (xvi) a carbonyl group, (xvii) a thiocarbonyl group, (xviii) a sulfate group, (xix) a sulfide group, (xx) a sulfoxide group, (xxi) a phosphine or phosphonium group, (xxii) a phosphate group, (xxiii) a mercapto group, (xxiv) a urethane group, or (xxv) a urea group, wherein $R_5$ and $R_6$ can each be joined to a phenyl ring in the central structure, wherein $\diagup\!\!\!^Y\!\!\diagdown$ is $\diagup\!\!\!^O\!\!\diagdown$, wherein $R_8$, $R_9$, and $R_{10}$ each, independently of the other, is optionally present and wherein each of $R_8$, $R_9$, and $R_{10}$, if present, is independently selected from (i) a hydrogen atom, (ii) an alkyl group, (iii) an aryl group, (iv) an arylalkyl group, or (v) an alkylaryl group;

wherein R" is optionally present and wherein R' and R", if present, are each independently selected from (i) an alkyl group, (ii) an aryl group, (iii) an arylalkyl group, or (iv) an alkylaryl group;

wherein at least one of R' or R" contains at least about 5 carbon atoms;

wherein CA is a hydrogen atom or a cation; and wherein A is an anion.

2. A compound according to claim 1 wherein a and b are each zero.

3. A compound according to claim 1 wherein at least one of $R_1$, $R_2$, $R_3$, and $R_4$ is an alkyl group.

4. A compound according to claim 1 wherein at least one of $R_1$, $R_2$, $R_3$, and $R_4$ is an aryl group.

5. A compound according to claim 1 wherein at least one of $R_1$, $R_2$, $R_3$, and $R_4$ is an arylalkyl group or an alkylaryl group.

6. A compound according to claim 1 wherein R' is an alkyl group.

7. A compound according to claim 6 wherein the alkyl group is a linear alkyl group or a branched alkyl group.

8. A compound according to claim 6 wherein the alkyl group is a saturated alkyl group or an unsaturated alkyl group.

9. A compound according to claim 6 wherein the alkyl group is a cyclic alkyl group.

10. A compound according to claim 6 wherein the alkyl group is a substituted alkyl group or an unsubstituted alkyl group.

11. A compound according to claim 1 wherein R' is an aryl group.

12. A compound according to claim 11 wherein the aryl group is a substituted aryl group or an unsubstituted aryl group.

13. A compound according to claim 1 wherein R' is an alkylaryl group or an arylalkyl group.

14. A compound according to claim 13 wherein the alkylaryl group or the arylalkyl group is a substituted alkylaryl group, a substituted arylalkyl group, an unsubstituted alkylaryl group, or an unsubstituted arylalkyl group.

15. A compound according to claim 1 wherein R' is an alkyl group having from about 18 to about 100 carbon atoms.

16. A compound according to claim 1, of the formula
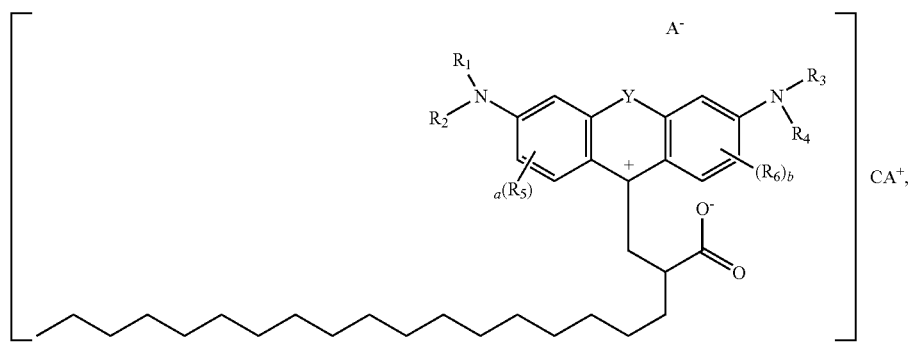
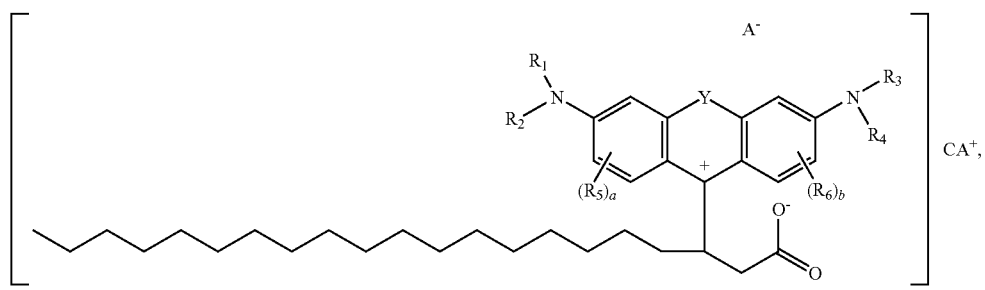
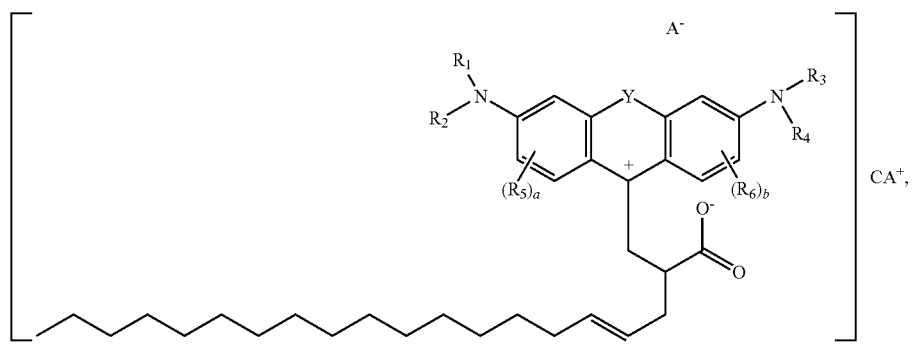
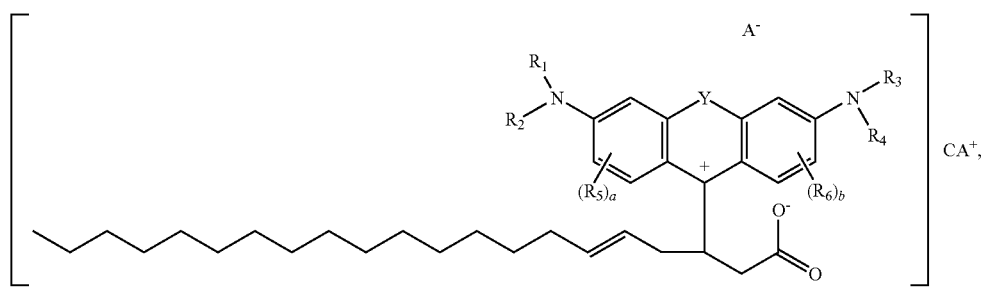
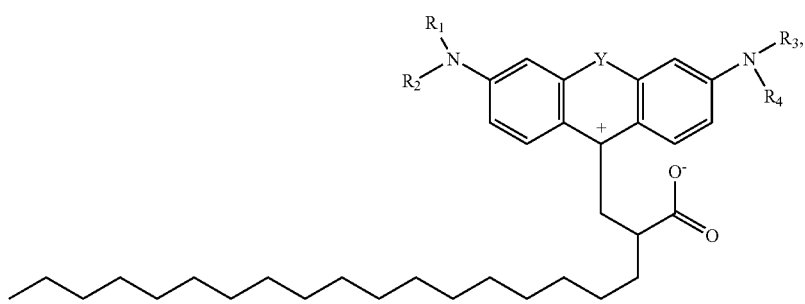

-continued
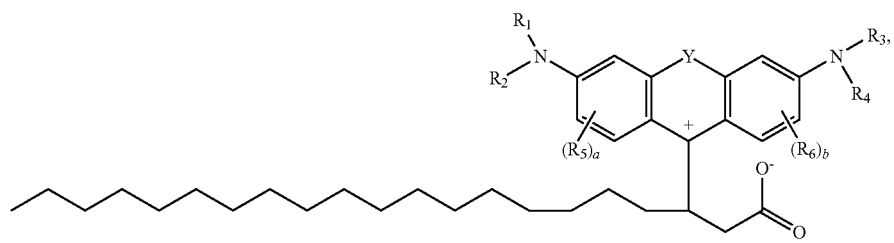
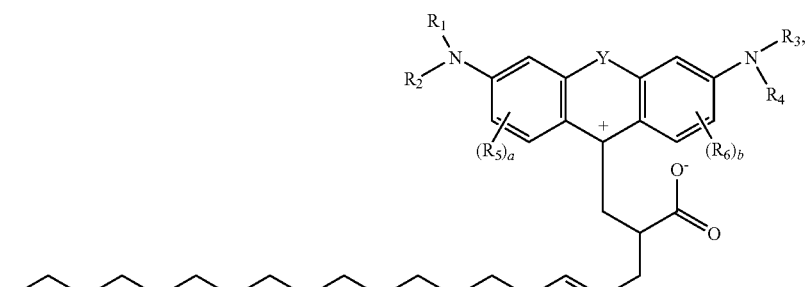
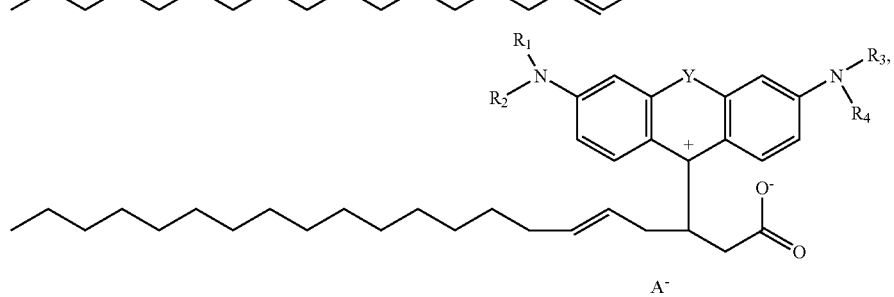
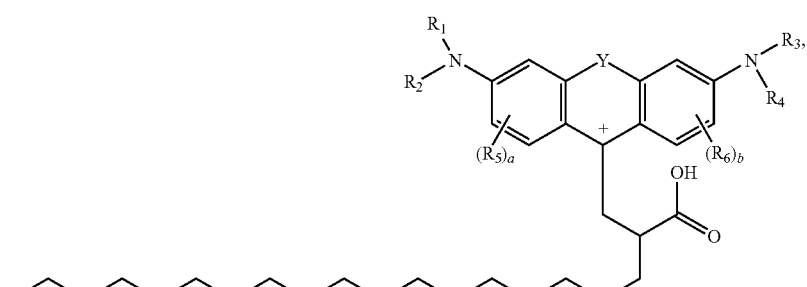
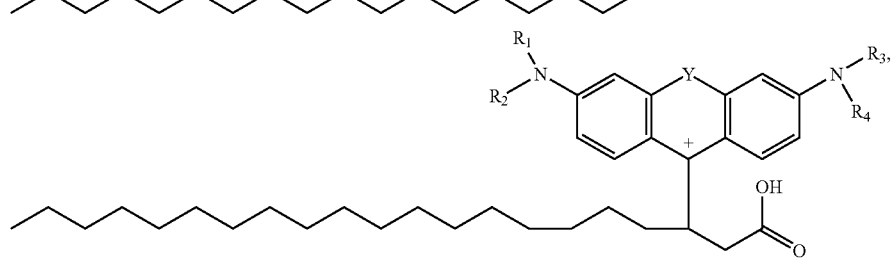
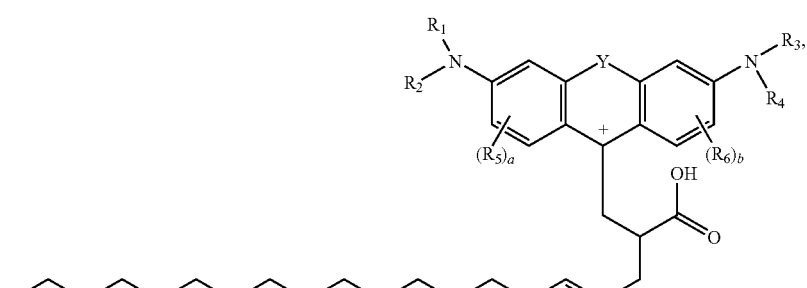

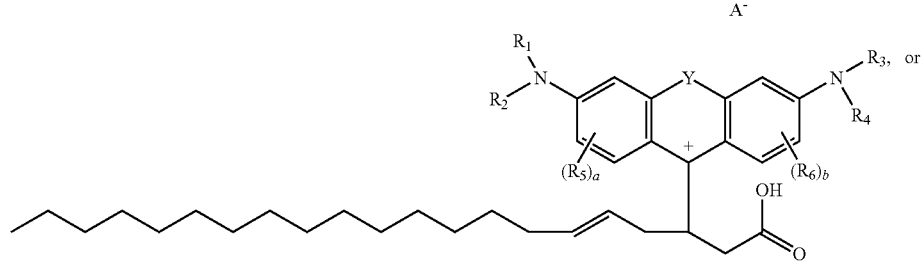
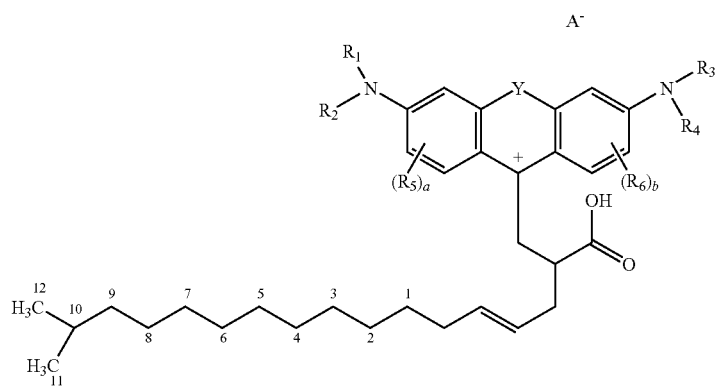
wherein Y is O.
17. A compound according to claim 1, of the formula
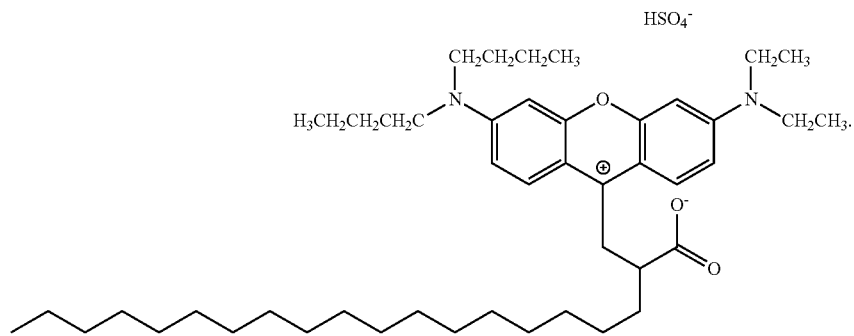
18. A compound according to claim 1, of the formula
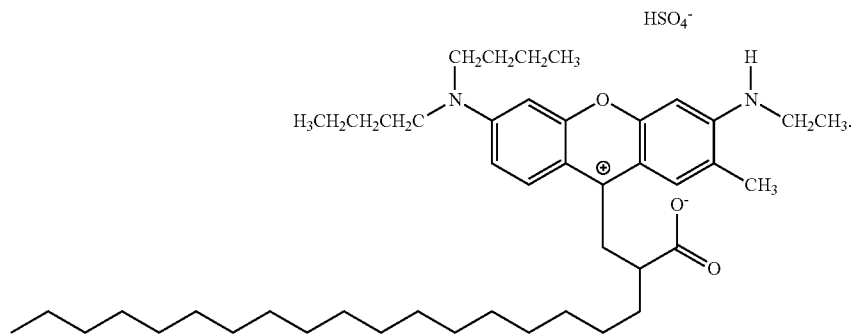

19. A compound according to claim 1, of the formula
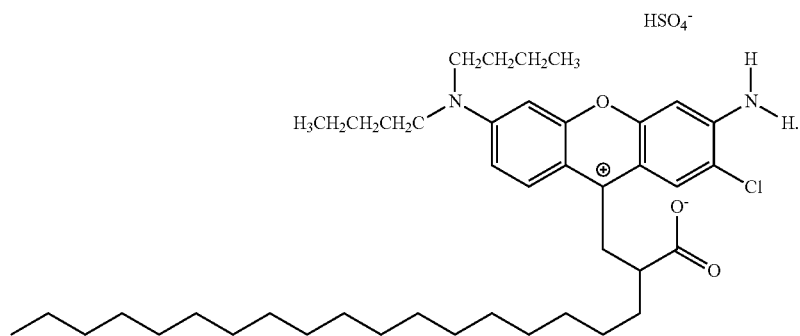
20. A compound according to claim 1, of the formula
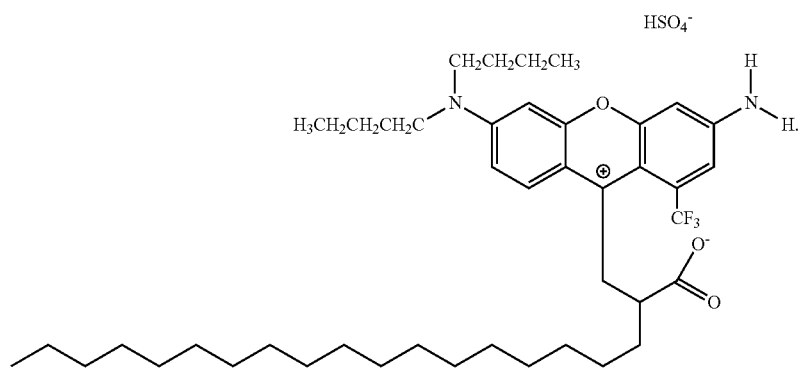
21. A compound according to claim 1, of the formula
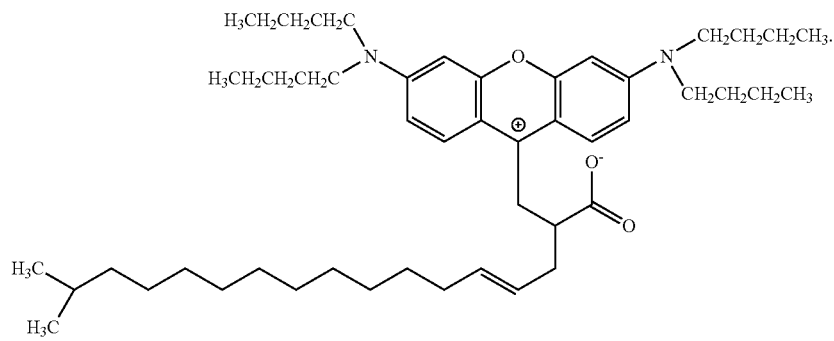
* * * * *